US009438713B2

(12) United States Patent
Lee et al.

(10) Patent No.: US 9,438,713 B2
(45) Date of Patent: Sep. 6, 2016

(54) METHOD AND APPARATUS FOR OPERATING ELECTRONIC DEVICE WITH COVER

(71) Applicant: Samsung Electronics Co., Ltd., Gyeonggi-do (KR)

(72) Inventors: Woo-Yong Lee, Gyeonggi-do (KR); Eun-Ju Lee, Seoul (KR); Min-Sheok Choi, Gyeonggi-do (KR); Seung-Tae Ha, Gyeonggi-do (KR); Jin-Woo Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 172 days.

(21) Appl. No.: 14/214,069

(22) Filed: Mar. 14, 2014

(65) Prior Publication Data

US 2014/0274217 A1    Sep. 18, 2014

Related U.S. Application Data

(60) Provisional application No. 61/784,012, filed on Mar. 14, 2013.

(30) Foreign Application Priority Data

Feb. 12, 2014   (KR) ........................ 10-2014-0016073

(51) Int. Cl.
*H04M 1/57* (2006.01)
*H04B 1/3888* (2015.01)
(Continued)

(52) U.S. Cl.
CPC ............ *H04M 1/575* (2013.01); *H04B 1/3888* (2013.01); *H04M 1/0245* (2013.01); *H04M 1/0266* (2013.01); *H04M 1/72569* (2013.01); *H04M 2250/12* (2013.01)

(58) Field of Classification Search
CPC ......... H04M 1/0214; H04M 2250/22; H04M 1/0216; H04M 1/0283; H04B 1/3888
See application file for complete search history.

(56) References Cited

U.S. PATENT DOCUMENTS

| 2001/0012769 A1* | 8/2001 | Sirola | G06F 1/1626 455/575.1 |
| 2004/0248621 A1* | 12/2004 | Schon | G06F 1/1616 455/566 |

(Continued)

FOREIGN PATENT DOCUMENTS

| KR | 10-2012-0096723 | 8/2012 |
| KR | 10-2012-0114331 | 10/2012 |

OTHER PUBLICATIONS

Modmyi (http://modmyi.com/content/5777-circumvent-annoying-slide-answer-ezdecline-giveaway.html—Nov. 1, 2011).*

(Continued)

*Primary Examiner* — Dung Hong

(57) ABSTRACT

A method includes detecting whether a cover covers the at least one portion of the display, receiving a call signal, displaying an information related to the reception of the call signal on the at least one portion of the display in response to the reception of the telephone call reception signal, detecting an external object that is adjacent to a surface of the display, and connecting a call in response to the detection of the adjacency of the external object. An electronic device includes a controller configured to cause the display to display receiving a call through the window in response to receiving the call while the cover is detected to cover the display, and control the call to be connected in response to detecting an external object that is adjacent to a surface of the display.

29 Claims, 18 Drawing Sheets

(51) Int. Cl.
*H04M 1/02* (2006.01)
*H04M 1/725* (2006.01)

(56) References Cited

U.S. PATENT DOCUMENTS

| | | | |
|---|---|---|---|
| 2006/0229118 A1* | 10/2006 | Kaneko | H04M 1/0214 455/575.3 |
| 2007/0149183 A1* | 6/2007 | Dunko | H04W 4/02 455/418 |
| 2010/0016041 A1 | 1/2010 | Ying et al. | |
| 2010/0053301 A1 | 3/2010 | Ryu et al. | |
| 2011/0065474 A1* | 3/2011 | Won | H02J 7/355 455/556.1 |
| 2011/0164058 A1 | 7/2011 | Lemay | |
| 2012/0212430 A1* | 8/2012 | Jung | G06F 1/1626 345/173 |
| 2013/0033418 A1* | 2/2013 | Bevilacqua | G06F 3/017 345/156 |
| 2013/0328917 A1* | 12/2013 | Zambetti | G06F 1/1626 345/620 |

OTHER PUBLICATIONS iPhone User Guide (https://manuals.info.apple.com/MANUALS/1000/MA1539/en_US/iPhone_iOS4_User_Guide.pdf—2011).*
Extended European Search Report dated Jun. 18, 2014 in connection With European Patent Application No. 14159642.9, 8 pages.

* cited by examiner

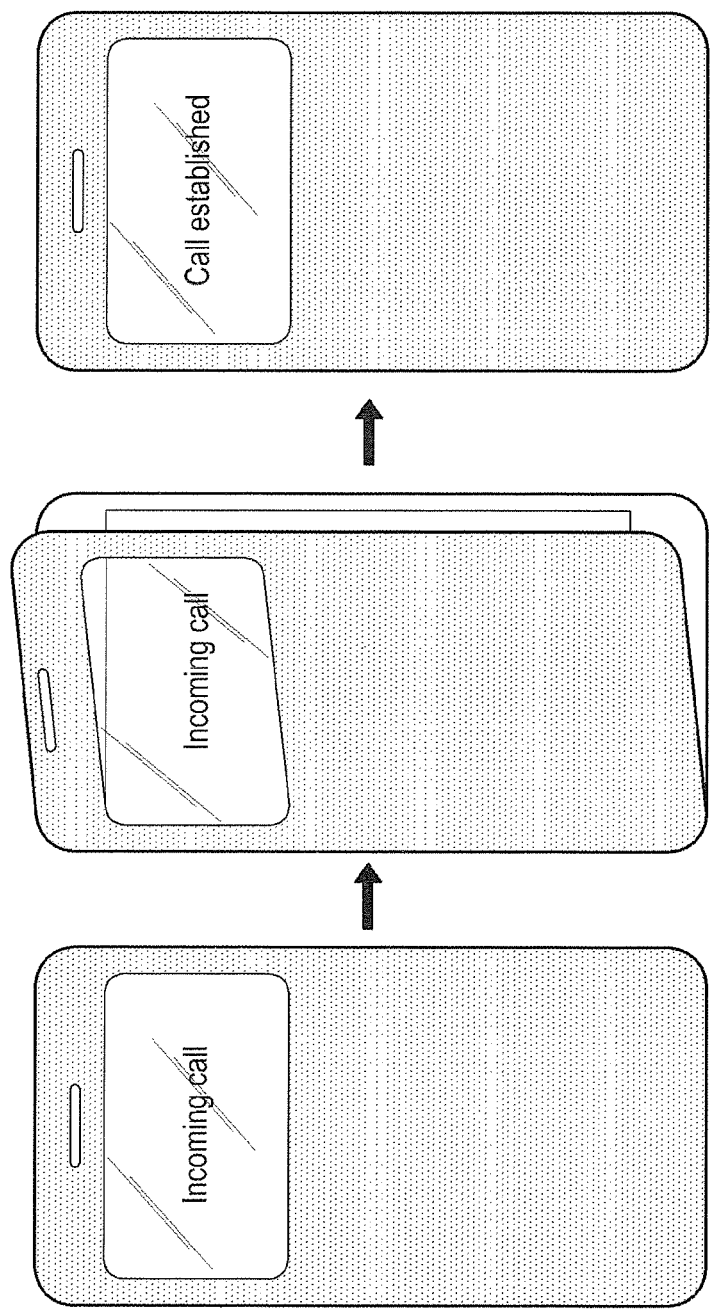

METHOD AND APPARATUS FOR OPERATING ELECTRONIC DEVICE WITH COVER

CROSS-REFERENCE TO RELATED APPLICATIONS AND CLAIM OF PRIORITY

The present application is related to and claims the priorities under 35 U.S.C. §119(a) to U.S. Patent Application Ser. No. 61/784,012, which was filed in United State Patent and Trademark Office on Mar. 14, 2013 and Korean Patent Application No. 10-2014-0016073, which was filed in Korean Intellectual Property Office on Feb. 12, 2014, the entire contents of which are hereby incorporated by reference.

TECHNICAL FIELD

The present disclosure relates to a method and a device for performing a function of an electronic device.

BACKGROUND

Various recent electronic devices have been developed to use diverse functions such as a photography function, a music function, a video function, a multimedia function, a game function, and the like as well as a wireless communication function. A display unit is provided on a front surface of the electronic devices for effective usage of the diverse functions. For example, in a case of a recent smart phone, a touch-sensitive display unit (e.g., a touch screen) is provided on a front surface thereof.

Meanwhile, in a case of a mobile electronic device, various cases or covers are provided for aesthetic purposes and for prevention of damage due to a scratch or an impact which can be generated in a carrying process or in use.

For example, a flip cover case (hereinafter, referred to as a flip cover), a slide cover case, or a folder cover case can be exemplified as the case.

SUMMARY

A method of operating an electronic device comprising a display is provided. The method includes detecting whether a cover covers the at least one portion of the display, receiving a call signal while the cover is detected to cover the at least one portion of the display, displaying an information related to the reception of the call signal on the at least one portion of the display in response to the reception of the call signal while the cover is detected to cover the at least one portion of the display, detecting an external object that is adjacent to a surface of the display while the cover covers the at least one portion of the display, and connecting a call in response to the detection of the adjacency of the external object while the cover covers the at least one portion of the display.

A method of operating an electronic device comprising a display is provided. The method includes detecting whether a cover has covered the at least one portion of the display, displaying a user interface according to a preset screen mode on the at least one portion of the display while the cover is detected to cover the at least one portion of the display, detecting a gesture of a user while the cover is detected that the at least one portion of the display is covered with the cover, and displaying a second user interface generated from at least one application in response to the detection of the gesture while the cover covers the at least one portion of the display.

An electronic device includes a display configure to display an image or video, a first sensor configured to detect an opening and closing of a cover with a window, the cover covering at least portion of the display, a second sensor configured to detect a user's gesture, and a controller configured to cause the display to display receiving a call on the at least portion of the display in response to receiving the call while the cover is detected to cover the display, and control the call to be connected in response to detecting an external object that is adjacent to a surface of the display.

According to the various embodiments of the present disclosure, the functions of the electronic device can be conveniently performed while the cover is mounted to the electronic device.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 9A to 9C illustrate performing functions of an electronic device by determining opening and/or closing of a cover according to an embodiment of the present disclosure;

DETAILED DESCRIPTION

Figure 1A:
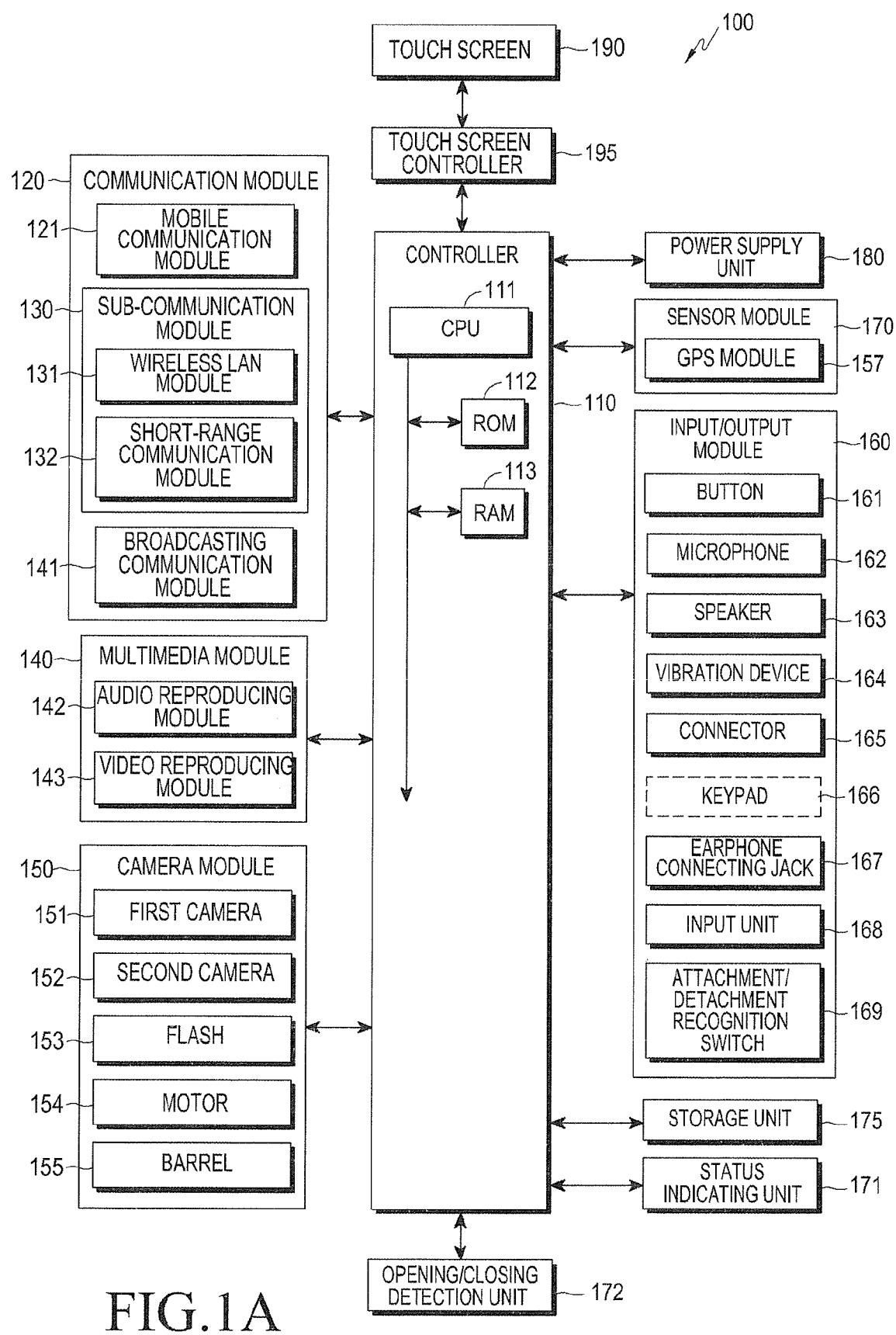
FIG. 1A is a block diagram schematically illustrating an example of an electronic device according to an embodiment of the present disclosure.

FIGS. 1A through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic devices. As the present disclosure allows for various changes and numerous embodiments, particular embodiments will be illustrated in the drawings and described in detail. However, it should be understood that there is no intent to limit the present disclosure to the particular forms disclosed, but on the contrary, the present disclosure is to cover all modifications, equivalents, and alternatives falling within the spirit and scope of the disclosure.

Although the terms including an ordinal number such as first, second, etc. can be used for describing various elements, the elements are not restricted by the terms. The terms are only used to distinguish one element from another element. For example, a first element could be termed a second element, and similarly, a second element could be also termed a first element without departing from the scope of the present disclosure. As used herein, the term "and/or" includes any and all combinations of one or more of the associated listed items The terms used in the present disclosure are only used to describe specific embodiments, and are not intended to limit the present disclosure. Singular forms are intended to include plural forms unless the context clearly indicates otherwise. In the present disclosure, the terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

Unless defined otherwise, all terms used herein, including technical and scientific terms, have the same meaning as commonly understood by those of skill in the art to which the present disclosure pertains. Such terms as those defined in a generally used dictionary are to be interpreted to have the meanings equal to the contextual meanings in the relevant field of art, and are not to be interpreted to have ideal or excessively formal meanings unless clearly defined in the present specification.

In embodiments of the present disclosure, a method and a device for performing a function of an electronic device are disclosed which can provide various types of User Interfaces (UIs) or User Experience (UX) through a screen projection window formed in a cover (or a case including the cover) (hereinafter, referred to as 'cover' or 'cover unit') attached to an electronic device.

In the various embodiments of the present disclosure, a method and a device for performing a function of an electronic device are disclosed which can provide various preset functions when a user makes various gestures in a state in which a cover attached to an electronic device is closed or open. In the following description, the term "gesture" means a movement made by a user using a body part thereof or a part of an object related to the user, and is not limited to a movement of a specific body part such as a finger or hand. For example, the gesture may be construed as a meaning including various motions such as folding of an arm, a movement of a head, a movement using a pen, and the like.

For example, the gesture may include operations such as a touch, release of a touch, rotation, a pinch, a spread, a touch drag, a flick, a swipe, a touch and hold, a tap, a double tap, a drag, a drag and drop, multi-swipes, a shake, and the like. Further, a touch state may include contact of a finger to a touch screen or very close access of the finger to the touch screen without actual contact. In the following various embodiments of the present disclosure, execution screens of various applications may be provided by the aforementioned various gestures of the user for an area displayed through a screen projection window of a cover while a display of an electronic device is covered with the cover. At this time, various functions according a user's situation may also be provided by using sensing information of various sensors provided to the electronic device according to various embodiments of the present disclosure.

Meanwhile, in descriptions of the following embodiments of the present disclosure, 'screen projection window' (at least partially transparent or translucent window) means a portion of a cover that is transparently or translucently formed such that at least one portion of a display unit of an electronic device can be viewed therethrough. In the following description, 'screen projection window' may also be referred to as, for example, a cover window, a transparent window, a translucent window, or the like. To this end, the screen projection window may be implemented by an opening formed in the cover, or a transparent or translucent material.

Further, in descriptions of the following embodiments of the present disclosure, a cover is a device attached to an electronic device and performing a function of covering at least one portion of the electronic device, and may be implemented integrally with the electronic device or detachably from the electronic device. At this time, in the embodiments of the present disclosure, the cover may be implemented to cover at least one portion or the whole of a display unit of an electronic device, and the at least one portion of the display unit covered with the cover can be viewed through the screen projection window implemented in the cover as described above.

Meanwhile, in the following embodiments of the present disclosure, the cover may have the same meaning as a case, or may also mean a part of the case. The embodiments of the present disclosure are not limited to a specific form of a cover, and any type of configuration implemented to cover at least one portion of a display unit of an electronic device may be used as the cover according to the embodiments of the present disclosure.

An electronic device according to an embodiment of the present disclosure can be an arbitrary device provided with a display unit. For example, the electronic device can include at least one of a smart phone, a tablet Personal Computer (PC), a mobile phone, a video telephone, an e-book reader, a desktop PC, a laptop PC, a netbook computer, a Personal Digital Assistant (PDA), a Portable Multimedia Player (PMP), an MP3 player, a mobile medical appliance, a camera, a game machine, and a wearable device (e.g., a Head-Mounted-Device (HMD) such as electronic glasses, electronic clothing, an electronic bracelet, an electronic necklace, an electronic appcessory, an electronic tattoo, and a smart watch).

According to some embodiments, the electronic device can be a smart home appliance with a communication function. The smart home appliance as an example of the electronic device can include at least one of for example, a television, a Digital Video Disk (DVD) player, an audio, a refrigerator, an air conditioner, a vacuum cleaner, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, and an electronic picture frame.

According to some embodiments, the electronic device can include at least one of various kinds of medical appliances (e.g., a Magnetic Resonance Angiography (MRA), a Magnetic Resonance Imaging (MRI), a Computed Tomography (CT), a scanning machine, an ultrasonic machine, and the like), a navigation device, a Global Positioning System (GPS) receiver, an Event Data Recorder (EDR), a Flight Data Recorder (FDR), a vehicle infotainment device, a head unit, electronic equipment for a ship (e.g., navigation equipment, a gyrocompass, and the like for a ship), avionics, an Automated Teller Machine (ATM) in a bank, a Point Of Sales (POS) device in a store, a security appliance, and an industrial or home robot.

According to some embodiments, the electronic device can include at least one of a part of furniture or a building/structure having a communication function, an electronic board, an electronic signature receiving device, a projector, and various kinds of measuring instruments (e.g., a water meter, an electric meter, a gas meter, a radio wave meter, and the like). The electronic device according to the present disclosure can be a combination of one or more of the aforementioned various devices. Further, it is obvious to those skilled in the art that the electronic device according to the present disclosure is not limited to the aforementioned devices.

Hereinafter, the electronic device according to the various embodiments will be described with reference to the accompanying drawings. The term "user" used in the various embodiments can refer to a person or a device (e.g., an artificial intelligence electronic device) using the electronic device. Further, the electronic device in present disclosure can be a flexible device or a flexible display device.

A mobile device (e.g., a mobile phone, a smart phone, and the like) can be an example of the electronic device, and some configurations of the electronic device which will be described below can be omitted or changed if necessary. First, an example of a detailed structure of the electronic device to which embodiments of the present disclosure can be applied will be described with reference to FIGS. 1A and 1B.

FIG. 1A is a block diagram schematically illustrating an example of an electronic device according to an embodiment of the present disclosure.

Referring to FIG. 1A, the electronic device 100 can include at least one of a controller 110, a communication module 120, a multimedia module 140, a camera module 150, an input/output module 160, a sensor module 170, a status indicating unit 171, an opening/closing detection unit 172, a storage unit 175, a power supply unit 180, and a touch screen 190.

More specifically, the electronic device 100 can be connected with an external device (not illustrated) by using at least one of a communication module 120, a connector 165, and an earphone connecting jack 167. Further, the electronic device 100 can be connected with another mobile device or electronic device, for example, one of a mobile phone, a smart phone, a tablet PC, a desktop PC, and a server in a wired or wireless manner.

The communication module 120 can include a mobile communication module 121, a sub-communication module 130, and a broadcasting communication module 141. The sub-communication module 130 can include at least one of a wireless Local Area Network (LAN) module 131 and a short range communication module 132. The multimedia module 140 can include at least one of an audio reproduction module 142 and a video reproduction module 143. The camera module 150 can include at least one of a first camera 151 and a second camera 152. Further, the camera module 150 can further include a flash 153, a motor 154, and a body tube 155. The input/output module 160 can include at least one of a button 161, a microphone 162, a speaker 163, a vibration device 164, the connector 165, and a keypad 166.

The controller 110 can include a Central Processing Unit (CPU) 111, a Read Only Memory (ROM) 112 storing a control program for control of the electronic device 100, and a Random Access Memory (RAM) 113 used as a storage area for storing a signal or data input from the outside of the electronic device 100 or for work performed in the electronic device 100. The CPU 111 can include a single core, a dual core, a triple core, or a quadruple core. The CPU 111, the ROM 112, and the RAM 113 can be connected to each other through an internal bus.

The controller 110 can control at least one of the communication module 120, the multimedia module 140, the camera module 150, the input/output module 160, the sensor module 170, the status indicating unit 171, the opening/closing detection unit 172, the storage unit 175, the power supply unit 180, the touch screen 190, and a touch screen controller 195.

The controller 110 can determine through the opening/closing detection unit 172 whether a cover covering the electronic device 100 is open or closed, and can control configuration and displaying of a screen (e.g., a resized screen) set to a corresponding location of the touch screen 190 corresponding to a location of a screen projection window formed in the cover or a screen set by a user in a state in which the cover is closed.

The controller 110 can detect a user input such as a hovering event generated when the input unit 168 approaches the touch screen 190 or is located proximate to the touch screen 190. In the below description, the term "hovering" can mean a state in which an external object (e.g., a finger or a stylus pen) does not directly contact the electronic device but maintains a distance by which the external object can be recognized by at least one part (e.g., the touch screen, the touch sensor, and/or the proximity sensor) of the electronic device, or a motion by a gesture in the state.

The controller 110 can detect various user inputs received through the camera module 150, the input/output module 160, and the sensor module 170 as well as the touch screen 190. The user input can include various types of information input into the electronic device 100 such as a gesture, a voice, a pupil action, an iris recognition, and a bio signal of the user as well as the touch. The controller 110 can control a predetermined operation or function corresponding to the detected user's input to be performed within the device 100, according to the embodiment of the present disclosure. Further, the controller 110 can output a control signal to the input unit 168 or the vibration device 164. The control signal can include information on a vibration pattern, and the input unit 168 or the vibration device 164 generates a vibration according to the vibration pattern.

The electronic device 100 can include at least one of the mobile communication module 121, the wireless LAN module 131, and the short range communication module 132 according to a capability thereof.

The mobile communication module 121 enables the electronic device 100 to be connected with an external electronic device through mobile communication using at least one antenna, namely, one or a plurality of antennas under control of the controller 110. The mobile communication module 121 can transmit/receive a wireless signal for a voice call, a video call, a Short Message Service (SMS) or a Multimedia Message Service (MMS) to/from a mobile phone with phone numbers input to the electronic device 100, a smart phone, a tablet PC or another electronic device.

The sub-communication module 130 can include at least one of the wireless LAN module 131 and the short distance communication module 132. For example, the sub-communication module 130 can include only the wireless LAN module 131 or only the short distance communication module 132. Alternatively, the sub-communication module 130 can also include both the wireless LAN module 131 and the short distance communication module 132.

The wireless LAN module 131 can be connected to the Internet in a place where a wireless Access Point (AP) is installed under the control of the controller 110. The wireless LAN module 131 can support a wireless LAN standard (IEEE802.11x) of the Institute of Electrical and Electronics Engineers (IEEE). The short range communication module 132 can wirelessly perform short range communication between the electronic device 100 and an external electronic device under the control of the controller 110. A short distance communication scheme can include Bluetooth, Infrared Data Association (IrDA) communication, Wi-Fi-Direct communication, Near Field Communication (NFC) and the like.

The broadcasting communication module 141 can receive a broadcasting signal (e.g., a TV broadcasting signal, a radio broadcasting signal, or a data broadcasting signal) and broadcasting additional information (e.g., EPG (Electric Program Guide) or ESG (Electric Service Guide)) which are transmitted from a broadcasting station through a broadcasting communication antenna under the control of the controller 110

The multimedia module 140 can include the audio reproduction module 142 or the video reproduction module 143. The audio reproduction module 142 can reproduce a digital audio file (for example, a file having a file extension of mp3, wma, ogg, or way) stored in the storage unit 175 or received under the control of the controller 110. The video reproduction module 143 can reproduce a digital video file (for example, a file having a file extension of mpeg, mpg, mp4, avi, mov, or mkv) stored or received according to a control of the controller 110. At this time, the multimedia module 140 can be integrated in the controller 110.

The camera module 150 can include at least one of the first camera 151 and the second camera 152 for photographing a still image, a moving image, a panoramic photograph under the control of the controller 110. Further, the camera module 150 can include at least one of the barrel 155 performing a zoom-in/out for photographing a subject, the motor 154 controlling a movement of the barrel 155, and the flash 153 providing an auxiliary light source required for photographing the subject. The first camera 151 can be disposed on a front surface of the electronic device 100, and the second camera 152 can be disposed on a rear surface of the electronic device 100.

The input/output module 160 can include at least one button 161, at least one microphone 162, at least one speaker 163, at least one vibration device 164, the connector 165, keypad 166, the earphone connection jack 167, and the input unit 168. The input/output module 160 is not limited thereto, and a cursor control such as a mouse, a track ball, a joystick, or cursor direction keys can be provided to control a movement of a cursor on the touch screen 190.

The button 161 can be formed on a front surface, a side surface, or a rear surface of a housing (or a case) of the electronic device 100, and can include at least one of a power/lock button, a volume button, a menu button, a home button, a back button, and a search button. The microphone 162 can receive a voice or a sound to generate an electrical signal under the control of the controller 110. The speaker 163 can output sounds corresponding to various signals or data (e.g., wireless data, broadcasting data, digital audio data, digital video data and the like) to the outside of the electronic device 100 under the control of the controller 110. The speaker 163 can output sounds (e.g., a button tone corresponding to a telephone call, a ringing tone, and a voice of a counterpart user) corresponding to functions performed by the electronic device 100. Further, one or more speakers 163 can be formed on a proper position or positions of the housing of the electronic device 100.

The vibration device 164 can convert an electrical signal to a mechanical vibration under the control of the controller 110. For example, the electronic device 100 in a vibration mode operates the vibration device 164 when a voice or video call is received from another device. One or more vibration devices 164 can be formed within the housing of the electronic device 100. The vibration device 164 can operate in response to a user input through the touch screen 190.

The connector 165 can be used as an interface for connecting the electronic device 100 with an external electronic device or a power source. The controller 110 can transmit data stored in the storage unit 175 of the electronic device 100 to an external electronic device or can receive data from the external electronic device through a wired cable connected to the connector 165. The electronic device 100 can receive power from a power source through the wired cable connected to the connector 165, or can charge a battery by using the power source.

The keypad 166 can receive a key input from a user for control of the electronic device 100. The keypad 166 can include a physical keypad formed in the electronic device 100 or a virtual keypad displayed on the touch screen 190. The physical keypad formed in the electronic device 100 can be excluded according to a capability or structure of the electronic device 100. The earphones can be connected to the electronic device 100 through insertion into the earphone connecting jack 167.

The input unit 168 can be inserted and maintained within the electronic device 100, and can be withdrawn or separated from the electronic device 100 when it is used. An attachment/detachment recognition switch 169 operating in accordance with attachment and detachment of the input unit 168 is provided in one area within the electronic device 100 into which the input unit 168 is inserted, and the attachment/detachment recognition switch 169 can output signals corresponding to the attachment and detachment of the input unit 168 to the controller 110. The attachment/detachment recognition switch 169 can be configured to directly or indirectly contact the input unit 168 when the input unit 168 is mounted. Accordingly, the attachment/detachment recognition switch 169 can generate the signal corresponding to the attachment or detachment of the input unit 168 (that is, signal notifying of the attachment or detachment of the input unit 168), and can output the generated signal to the controller 110, based on whether the attachment/detachment recognition switch 169 contacts the input unit 168.

The sensor module 170 includes at least one sensor for detecting a state of the electronic device 100. For example, the sensor module 170 can include at least one of a proximity sensor for detecting whether a user approaches the electronic device 100, an illumination sensor for detecting an amount of ambient light of the electronic device 100, a motion sensor for detecting a motion of the electronic device 100 (for example, rotation, acceleration, or vibration of the electronic device 100), a geo-magnetic sensor for detecting a point of the compass by using the Earth's magnetic field, a gravity sensor for detecting a gravity action direction, an altimeter for measuring an atmospheric pressure to detect an altitude, and a GPS module 157. In the various embodiments of the present disclosure, opening/closing of a cover is determined through the opening/closing detection unit 172, and various functions can be provided by using information sensed through the at least one sensor module 170.

The GPS module 157 can receive radio waves from a plurality of GPS satellites in Earth's orbit, and can calculate a position of the electronic device 100 by using Time of Arrival from the GPS satellites to the electronic device 100.

The storage unit 175 can store a signal or data input/output according to an operation of the communication module 120, the multimedia module 140, the camera module 150, the input/output module 160, the sensor module 170, or the touch screen 190 under the control of the controller 110. Further, the storage unit 175 can store various kinds of information for providing various embodiments, according to the embodiment of the present disclosure. For example, the storage unit 175 can store information for which values sensed by the electronic device 100 and current status information are mapped onto a specific function. Further, the storage unit 175 can store information displayed in an area corresponding to a screen projection window formed in a cover among the whole area of the display unit (e.g., the touch screen 190) when the cover is closed according to an embodiment of the present disclosure.

The storage unit 175 can store a control program and applications for control of the electronic device 100 or the controller 110. One of the control program or the applications can identify opening/closing of a cover according to an embodiment of the present disclosure, and can control such that functions corresponding to status information, gesture information of a user, sensing information from a sensor, and the like are performed when the cover is closed.

The term "storage unit" can be used as a term referring to a random data storage device such as the storage unit 175, the ROM 112 or the RAM 113 within the controller 110, or a memory card (for example, an SD card or a memory stick) installed in the electronic device 100. The storage unit 175 can also include a non-volatile memory, a volatile memory, a Hard Disk Drive (HDD), or a Solid State Drive (SSD).

Further, the storage unit 175 can store applications having various functions such as a navigation function, a video call function, a game function, and a time based alarm function, images for providing a Graphical User Interface (GUI) related to the applications, databases or data related to a method of processing user information, a document, and a touch input, background images (a menu screen, an idle screen, or the like) or operating programs required for driving the electronic device 100, and images photographed by the camera module 150.

The storage unit 175 is a machine (e.g., a computer)-readable medium, and the term of the machine-readable medium can be defined as a medium for providing data to the machine such that the machine can perform a specific function. In addition, the storage unit 175 can include a non-volatile medium and a volatile medium. All of these media should be a type that allows commands transferred by the media to be detected by a physical mechanism through which the machine reads the commands.

The machine readable medium includes at least one of a floppy disk, a flexible disk, a hard disks, a magnetic tape, a Compact Disc Read-Only Memory (CD-ROM), an optical disk, a punch card, a paper tape, a RAM, a Programmable Read-Only Memory (PROM), an Erasable PROM (EPROM), a Flash-EPROM, and an embedded Multi-Media Card (eMMC), without being limited thereto.

The power supply unit 180 can supply power to one battery or a plurality of batteries arranged in the housing of the electronic device 100 under the control of the controller 110. The one battery or the plurality of batteries supply the power to the electronic device 100. Further, the power supply unit 180 can supply power input from an external power source through a wired cable connected to the connector 165 to the portable device 100. In addition, the power supply unit 180 can also supply power wirelessly input from the external power source through a wireless charging technology to the portable device 100.

The electronic device 100 can include at least one touch screen 190 providing a user graphical interface corresponding to various services (e.g., a phone call, data transmission, broadcasting, and photography) to the user. The touch screen 190 can output, to the touch screen controller 195, an analog signal corresponding to at least one user input which is input to the user graphical interface.

The touch screen 190 can receive at least one user input through a user's body (e.g., fingers including a thumb) or the input unit 168 (e.g., a stylus pen, an electronic pen, or the like). The touch screen 190 can be implemented, for example, in a resistive type, a capacitive type, an infrared type, an acoustic wave type, or combinations thereof.

The touch screen 190 can include at least two touch panels capable of detecting touches or approaches of the respective input means in order to receive inputs by a finger, an electronic pen, a stylus pen, a glove, and the input unit 168, respectively. The at least two touch panels can provide different output values to the touch screen controller 195, and the touch screen controller 195 can differently recognize the values input from the at least two touch screen panels to distinguish whether the input from the touch screen 190 is an input by the finger, an input by the electronic pen, an input by the stylus pen, an input in a state of wearing the glove, or an input by the input unit 168.

In addition, the touch is not limited to a touch between the touch screen 190 and the user's body or touchable input means, and can include a non-contact (e.g., a case where a detectable interval between the touch screen 190 and the user's body or touchable input means is 1 mm or shorter). The detectable interval of the touch screen 190 can vary depending on a capability or structure of the electronic device 100.

The touch screen controller 195 converts an analog signal input from the touch screen 190 to a digital signal, and transmits the converted digital signal to the controller 110. The controller 110 can control the touch screen 190 by using the digital signal received from the touch screen controller 195. The touch screen controller 195 can identify a hovering interval or distance as well as a position of the user input by detecting a value (for example, a current value or the like) output through the touch screen 190, and can convert the identified distance value to a digital signal (for example, a Z coordinate) to provide the converted digital signal to the controller 110. Further, the touch screen controller 195 can detect a pressure applied to the touch screen 190 by the user input means by detecting the value (for example, the current value or the like) output through the touch screen 190, and can convert the identified pressure value to a digital signal to provide the converted digital signal to the controller 110.

Figure 1B:
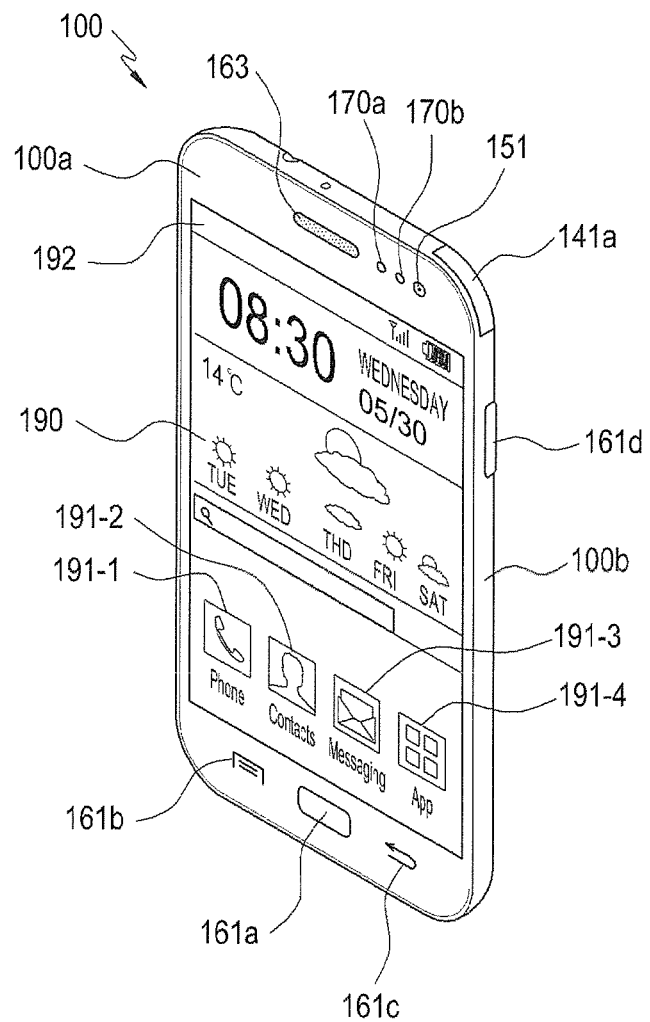
FIG. 1B is a front perspective view of an electronic device according to an embodiment of the present disclosure.
Figure 1C:
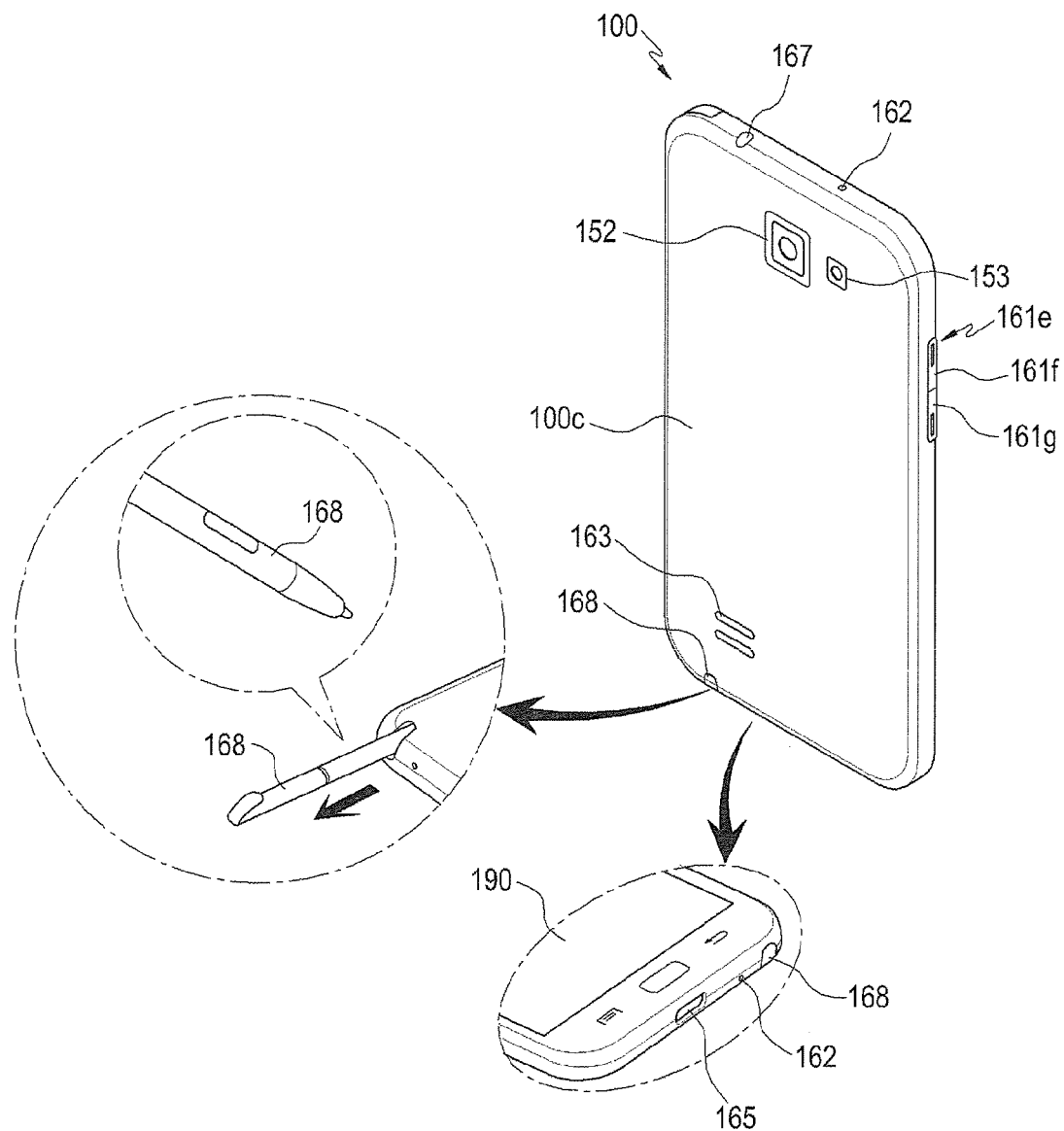
FIG. 1C is a rear perspective view of the electronic device according to the embodiment of the present disclosure.

FIG. 1B is a front perspective view of an electronic device according to an embodiment of the present disclosure. FIG. 1C is a rear perspective view of the electronic device according to the embodiment of the present disclosure.

Referring to FIGS. 1B and 1C, a touch screen 190 is disposed at a center of a front surface 100*a* of an electronic device 100 as an example of a display unit. The touch screen 190 can be formed to be large enough to occupy most of the front surface 100*a* of the electronic device 100. FIG. 1B illustrates an example in which a main home screen is displayed on the touch screen 190. The main home screen is a first screen that is displayed on the touch screen 190 when the electronic device 100 is turned on. Further, in a case in which the electronic terminal 100 has several pages of different home screens, the main home screen can be a first home screen among the several pages of home screens. Shortcut icons 191-1, 191-2, and 191-3 for executing frequently used applications, a main menu switching key 191-4, time, weather, and the like can be displayed on the home screen. When a user selects the main menu switching key 191-4, a menu screen is displayed on the touch screen 190. Furthermore, a status bar 192 displaying a status of the electronic device 100 such as a battery charging status, strength of a received signal, and current time can also be formed at an upper end of the touch screen 190. Status information for at least one application can be displayed in a form of an image, a text, or an icon on the status bar 192. Further, according to various embodiments of the present disclosure, the status information (e.g., also referred to as 'indicator') for the applications can be displayed in various forms including the aforementioned status bar 192 on the touch screen 190. A home button 161*a*, a menu button 161*b*, and a back button 161*c* can be formed at a lower portion of the touch screen 190. The home button, the menu button, and the back button can also be changed in position, and can also be omitted. The main home screen is displayed on the touch screen 190 through the home button 161*a*. For example, when the home button 161*a* is selected in a state where any home screen different from the main home screen or the menu screen is displayed on the touch screen 190, the main home screen can be displayed on the touch screen 190. Further, when the home button 161*a* is selected while applications are being executed on the touch screen 190, the main home screen can be displayed on the touch screen 190. Furthermore, the home button 161*a* can also be used to allow recently used applications or a task manager to be displayed on the touch screen 190.

The menu button 161*b* provides a connection menu that can be displayed on the touch screen 190. The connection menu can include a widget addition menu, a background image change menu, a search menu, an editing menu, and an environment setting menu.

The back button 161*c* can be used to display a screen executed shortly before a currently executed screen or to terminate the most recently used application.

A first camera 151, an illumination sensor 170*a*, and a proximity sensor 170*b* can be disposed at an edge of the front surface 100*a* of the electronic device 100. A second camera 152, a flash 153, and a speaker 163 can be disposed on a rear surface 103 of the electronic device 100 as illustrated in FIG. 1C.

A power/lock button 161*d*, a volume button 161*e* including a volume up button 161*f* and a volume down button 161*g*, a terrestrial DMB antenna 141*a* for broadcasting reception, and one or a plurality of microphones 162 can be disposed on a side surface 102 of the electronic device 100. The DMB antenna 141*a* can be fixed to the electronic device 100, or can be formed detachably from the electronic device 100.

A connector 165 is formed on a bottom surface of the electronic device 100. A plurality of electrodes are formed in the connector 165, and can be connected with an external device in a wired manner An earphone connecting jack 167 can be formed on a top surface of the electronic device 100. Earphones can be inserted into the earphone connecting jack 167.

An input unit 168 (e.g., a stylus pen) can be mounted on the bottom surface of the electronic device 100. The input unit 168 can be inserted into the electronic device 100, and can be withdrawn or separated from the electronic device 100 when it is used. Further, when the input unit 168 is withdrawn and separated from the electronic device 100, the electronic device 100 can detect the separation of the input unit 168 to provide various functions.

The example of the detailed structure of the electronic device 100 to which the present disclosure can be applied has been described above. As described above, the electronic device 100 to which the present disclosure can be applied can include at least some of the functions illustrated in FIGS. 1A to 1C, and the at least some of the functions can be omitted or replaced by other functions.

A device for performing a function of an electronic device according to any one of various embodiments of the present disclosure can include a display unit that provides a display area; a first sensing unit that detects an opening/closing status of a cover that covers a display area of the electronic device and is formed in at least one area thereof with a screen projection window; a second sensing unit that detects a user's gesture; and a controller that displays telephone call reception on at least one portion of the display area in response to reception of a telephone call reception signal when the telephone call reception signal is received while the cover is detected to cover the display area, and controls a telephone call to be connected in response to detection of adjacency when it is detected that at least one portion of one surface of the electronic device containing the display area is adjacent to an external object.

The first sensing unit can acquire set sensing information, the second sensing unit can detect a first gesture of a user, and the controller can control a set function to be performed when the acquired sensing information is lower than or equal to a set threshold value. The sensing information can include an illumination value.

The controller can determine whether a first gesture of a user is made, after receiving a user input, and can control a set function to be performed when the first gesture of the user is made after the receiving of the user input. The user input is generated by a set key input. The controller can control the set function to be terminated when a second set gesture of the user is detected after the set function is performed. The second gesture of the user can be a user gesture having a different direction from that of the first gesture.

Hereinafter, a structure of a cover attached to and detached from the electronic device 100 according to various embodiments of the present disclosure will be described with reference to FIGS. 2A to 3D.

FIGS. 2A to 2E illustrate examples in which a cover is formed at an upper central portion thereof with a screen projection window, and FIGS. 3A to 3D illustrate examples in which a cover is formed on a left or right side thereof with a screen projection window. At this time, embodiments of the present disclosure can be applied though the screen projection window has any shape and size and is disposed at any location in the cover.

FIGS. 2A to 2E are views schematically illustrating an electronic device and a cover including a screen projection window according to an embodiment of the present disclosure. FIGS. 3A to 3D are views schematically illustrating an electronic device and a cover including a screen projection window according to another embodiment of the present disclosure.

The electronic device and the cover including the screen projection window according to the embodiment of the present disclosure will be described with reference to FIGS. 2A to 2E, and in describing the another embodiment of the present disclosure, the description of the embodiment of the present disclosure will be applied to the same configurations and reference numerals as those in the embodiment of the present disclosure. Further, the covers 200a and 200b according to the embodiments which will be described below can be alternately mounted to the electronic device 100 of the present disclosure.

Figure 2A:
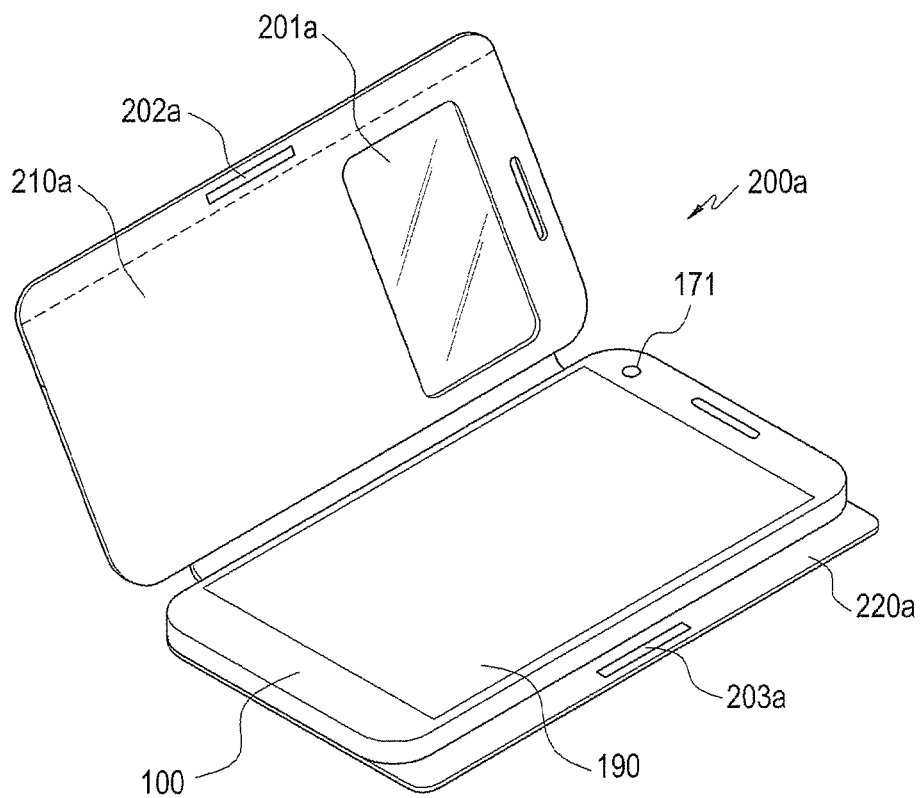
FIGS. 2A to 2E are views schematically illustrating an electronic device and a cover including a screen projection window according to an embodiment of the present disclosure.

FIG. 2A schematically illustrates the electronic device and the cover including the screen projection window according to the embodiment of the present disclosure.

Referring to FIG. 2A, the electronic device 100 can be protected by the cover 200a (or case) including a screen projection window 201a. The cover 200a can include a front cover 210a and a rear cover 220a, and can also be configured with only the front cover.

Figure 2B:
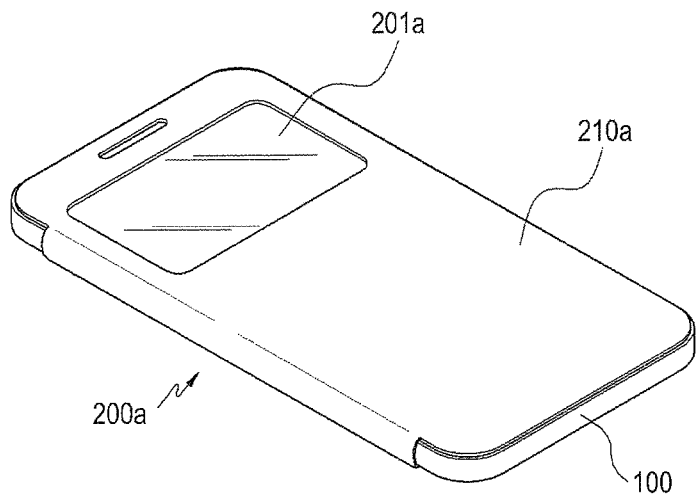

Referring to FIG. 2B, in a case in which the cover 200a is attached to the electronic device 100, at least one portion of a full screen of a touch screen 190 provided to the electronic device 100 can be exposed through the screen projection window 201a. At this time, the screen projection window 201a can be formed of a transparent or translucent member, or can be formed as an opening. Accordingly, when the screen of the electronic device is exposed through the screen projection window 201a formed in the cover 200a, at least one portion of the touch screen can be viewed from the outside through the screen projection window 201a.

For example, the screen projection window 201a can be formed at a location in the cover 200a to correspond to an upper side of the electronic device as illustrated in FIG. 2B. However, the location of the screen projection window 201a is not limited to a specific location, and the screen projection window 201a can be formed at diverse locations in the cover 200a.

Further, an attachment 202a can be included in the front cover 201a, and an attachment 203a can be included in the rear cover 220a. When a controller 110 which will be described below desires to detect opening/closing of the cover 200a, the controller 110 can detect a separation between the attachment 202a included in the front cover 210a and the attachment 203a included in the rear cover 220a to thereby detect the opening/closing of the cover 200a. However, the cover opening/closing detection method of the present disclosure is not limited to the aforementioned method, and any method of detecting the opening/closing of the cover can be employed for the present disclosure. Further, as illustrated in FIG. 2A, a status indicating unit 171 can be provided at a specific location on a front surface of the electronic device 100 to display a status of the electronic device 100 through various methods.

Figure 2C:
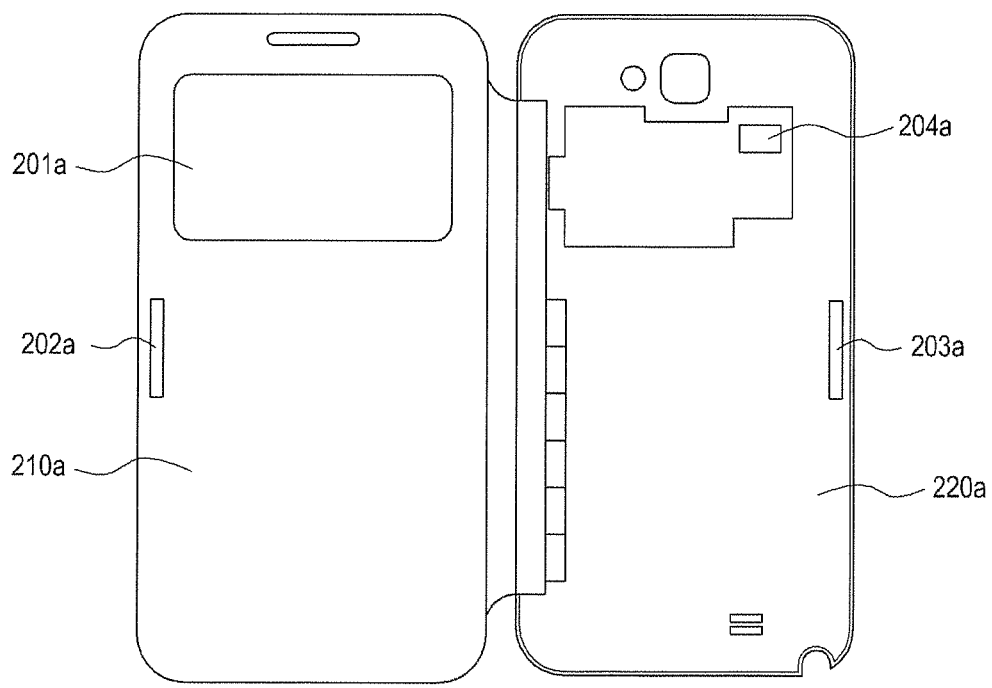

FIG. 2C is a schematic view of the cover which is put on the electronic device in FIG. 2B. Referring to FIG. 2C, the rear cover 220a of the cover 200a can also be formed as a battery cover. For example, the rear cover 220a can be configured to cover a battery 120 disposed on a rear surface of the electronic device 100. As described above, the screen projection window 201a can be included in the cover 200a, and at least one portion of the full display screen of the electronic device 100 can be exposed through the screen projection window 201a. The screen projection window 201a covers a front surface of the touch screen 190 and is provided such that a screen displayed on the touch screen 190 can be visually identified therethrough. For example, the screen projection window 201a can be formed of a transparent or translucent member, or can be formed as an opening.

As described above, the attachment 202a included in the front cover 210a and the attachment 203a included in the rear cover 220a can be formed in the cover 200a. A connection terminal 204a that can be electrically connected with the electronic device 100 can be formed in the cover 200a. As will be described below, the electronic device 100 can include a connection terminal that can be electrically connected with the connection terminal 204a. The controller 110 of the electronic device can recognize the separation between the attachment 202a included in the front cover 210a of the cover 200a and the attachment 203a included in the rear cover 220a through the connection terminal. At this time, the attachments 202a and 203a can be formed of a magnet. When the attachment 202a included in the front cover 210a and the attachment 203a included in the rear cover 220a are separated from each other, a change in an electrical signal can be generated. The controller 110 of the electronic device can recognize the separation between the attachment 204a included in the front cover 210a and the attachment 203a included in the rear cover 220a, by receiving the change of the electrical signal through the connection terminal 204a of the cover and the connection terminal of the electronic device.

Further, an attachment can be formed within the electronic device 100. At this time, the attachment formed within the electronic device can be formed of a member, such as a magnet or iron, which can magnetically attract the attachment included in the front cover of the cover. The attachment formed within the electronic device can be formed behind the touch screen 190 or at a bezel portion of the electronic device. When the attachment included in the front cover and the attachment formed within the electronic device are separated from each other, a change in an electrical signal can be generated. The controller 110 of the electronic device can recognize the separation between the attachment included in the front cover and the attachment formed within the electronic device, by receiving the change of the electrical signal through the connection terminal of the cover and the connection terminal of the electronic device.

Accordingly, the electronic device 100 can determine the opening/closing of the cover 200*a*. The method of determining the opening/closing of the cover 200*a* through the magnet as described above is only one exemplary embodiment, and the present disclosure is not limited to the aforementioned method. For example, the electronic device 100 can also determine the opening/closing of the cover 200*a* through any other method (e.g., methods using a proximity sensor, an illumination sensor, an infrared sensor, and the like which are provided at a front surface portion of the electronic device 100), and the embodiments of the present disclosure are not limited to a specific opening/closing determination method.

Figure 2D:
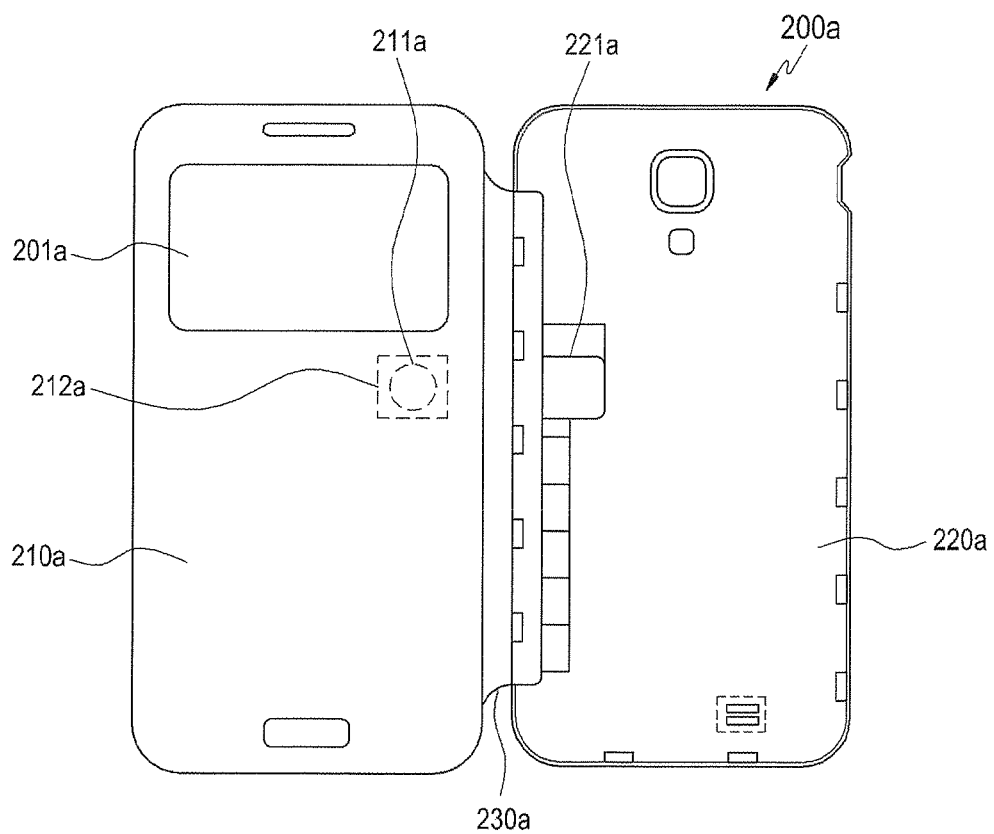

For example, the electronic device 100 can be protected by a cover coupled or attached in a folder type or a flip type. Alternatively, the cover can also operate in a sliding type. Further, as illustrated in FIG. 2D, a cover can include a rear cover 220*a* supporting a rear surface of the electronic device 100, a front cover 210*a* for protecting a front surface of the electronic device 100, and a connection part 230*a* integrally extending from the front cover 210*a* and connected to the rear cover 220*a*.

According to various embodiments, the front cover 210*a* can also move in a direction of covering the back of the rear cover 220*a* of the electronic device similarly to a direction of covering a display of the electronic device 100 due to flexibility of the connection part 230*a* connecting the front cover 210*a* and the rear cover 220*a*. Accordingly, though the front cover 210*a* does not close and moves in the direction of covering the back of the rear cover 220*a*, the electronic device 100 can recognize closing of the front cover 210*a* due to a magnetic force of a magnet 211*a* provided to the front cover 210*a*. Thus, when the front cover 210*a* moves in the direction of covering the back of the rear cover 220*a*, shielding units 212*a* and 221*a* for shielding the magnetic force of the magnet 211*a* can be required to prevent the electronic device from recognizing the magnetic force of the magnet 211*a*. The shielding unit 221*a* can be provided to the rear cover 220*a* such that the electronic device can detect the magnetic force of the magnet 211*a* only when the front cover 210*a* moves in the direction of covering the electronic device 100.

According to the various embodiments, the front cover 210*a* can also move in the direction of covering the display of the electronic device 100 due to the flexibility of the connection part 230*a* connecting the front cover 210*a* and the rear cover 220*a*. At this time, the opening/closing of the cover can also be determined by the aforementioned various types of sensors (e.g., the illumination sensor, etc.).

Figure 2E:
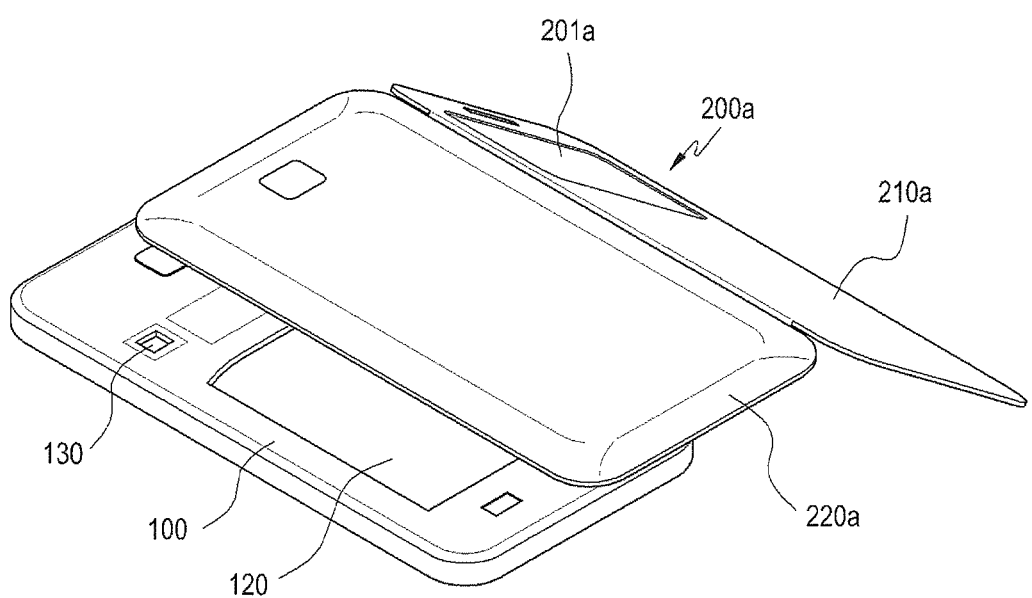

FIG. 2E schematically illustrates rear surfaces of the electronic device and the cover of FIG. 2B. Referring to FIG. 2E, the electronic device 100 can include at least one connection terminal 130. At this time, the connection terminal 130 can be electrically connected with the connection terminal 204*a* of the cover as described above. The controller 110 of the electronic device can recognize the separation between the attachment 202*a* included in the front cover 210*a* and the attachment 203*a* included in the rear cover 220*a* through the connection terminal 130. The rear cover 220*a* of the cover 200*a* can also be formed as a battery cover for covering the battery 120 of the electronic device 100 as illustrated in FIG. 2E.

In addition, the screen projection window 201*a* formed at the upper side of the front cover 210*a* of the cover 200*a* is illustrated as an example in FIGS. 2B to 2E. However, the screen projection window 201*a* can be formed at diverse locations. For example, as illustrated in FIGS. 3A to 3D, a screen projection window 201*b* can also be formed on one side of a front cover 210*b*. For example, the screen projection window 201*b* can also be formed on a right side of the front cover 201*b*. In describing embodiments illustrated in FIGS. 3A to 3D, the description of the embodiments illustrated in FIGS. 2A to 2E will be applied to the same configurations and reference numerals as those in the embodiments illustrated in FIGS. 2A to 2E. Further, the covers 200*a* and 200*b* according to the aforementioned embodiments can also be alternately mounted to the electronic device 100 of the present disclosure.

Referring to FIGS. 3A to 3D, an electronic device 100 can be protected by the cover 200*b* (or case) including the screen projection window 201*b*. The cover 200*b* can include the front cover 210*b* and a rear cover 220*b*, and can also be configured with only the front cover.

Figure 3A:
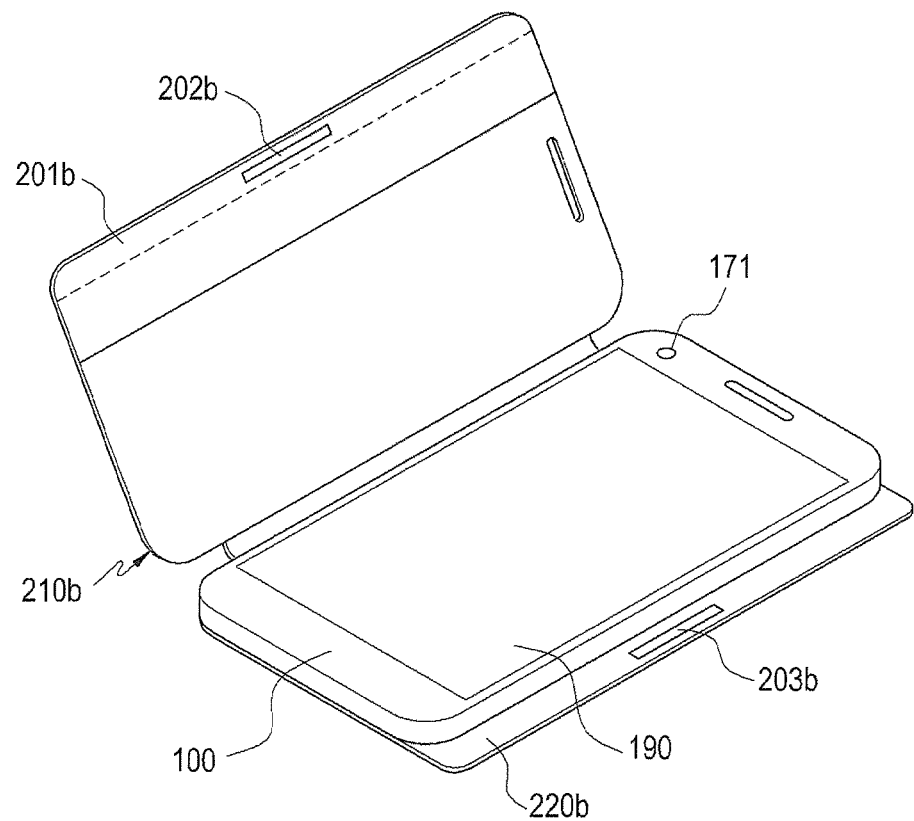
FIGS. 3A to 3D are views schematically illustrating an electronic device and a cover including a screen projection window according to another embodiment of the present disclosure.
Figure 3B:
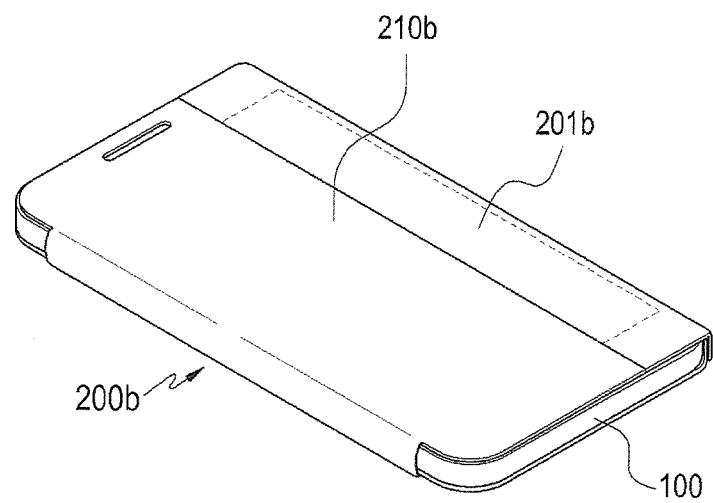
Figure 3C:
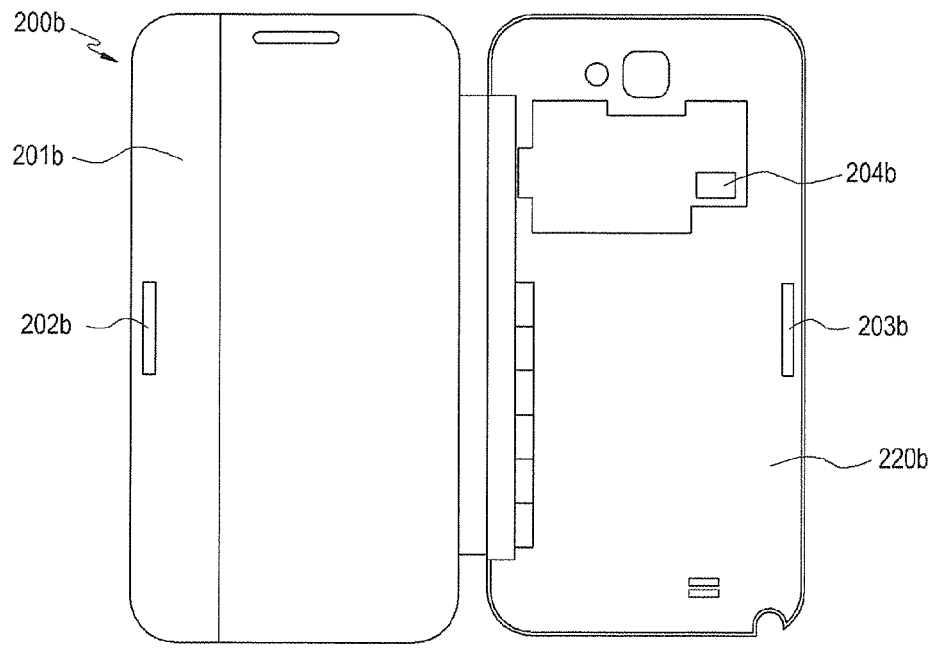

Referring to FIG. 3B, in a case in which the cover 200*b* is attached to the electronic device 100, at least one portion of a full screen of a touch screen 190 provided to the electronic device 100 can be exposed through the screen projection window 201*b*. At this time, the screen projection window 201*b* can be formed of a transparent or translucent member, or can be formed as an opening. Accordingly, when the screen of the electronic device is exposed through the screen projection window 201*b* formed in the cover 200*b*, at least one portion of the touch screen can be viewed from the outside through the screen projection window 201*b*.

Further, an attachment 202*b* can be included in the front cover 201*b*, and an attachment 203*b* can be included in the rear cover 220*b*. When a controller 110 desires to detect opening/closing of the cover 200*b* similarly to the embodiments illustrated in FIGS. 2A to 2E, the controller 110 can detect a separation between the attachment 202*b* included in the front cover 210*b* and the attachment 203*b* included in the rear cover 220*b* to thereby detect the opening/closing of the cover 200*b*. Further, as illustrated in FIG. 3A, a status indicating unit 171 can be provided at a specific location on a front surface of the electronic device 100 to display a status of the electronic device 100 through various methods. However, the cover opening/closing detection method of the present disclosure is not limited to the aforementioned method, and any method of detecting the opening/closing of the cover can be employed for the present disclosure. Further, referring to FIG. 3C, a connection terminal 204*b* that can be electrically connected with the electronic device 100 can be formed in the cover 200*b* as described above with reference to FIG. 2C. As will be described below, the electronic device 100 can include a connection terminal that can be electrically connected with the connection terminal 204*b*. The controller 110 of the electronic device can recognize the separation between the attachment 202*b* included in the front cover 210*b* of the cover 200*b* and the attachment 203*b* included in the rear cover 220*b* through the connection terminal. At this time, the attachments 202*b* and 203*b* can be formed of a magnet. When the attachment 202b included in the front cover 210b and the attachment 203b included in the rear cover 220b are separated from each other, a change in an electrical signal can be generated. The controller 110 of the electronic device can recognize the separation between the attachment 204b included in the front cover 210b and the attachment 203b included in the rear cover 220b, by receiving the change of the electrical signal through the connection terminal 204b of the cover and the connection terminal of the electronic device. Opening/closing of the cover 200b can be identified through the separation between the attachments 202b and 203b.

Figure 3D:
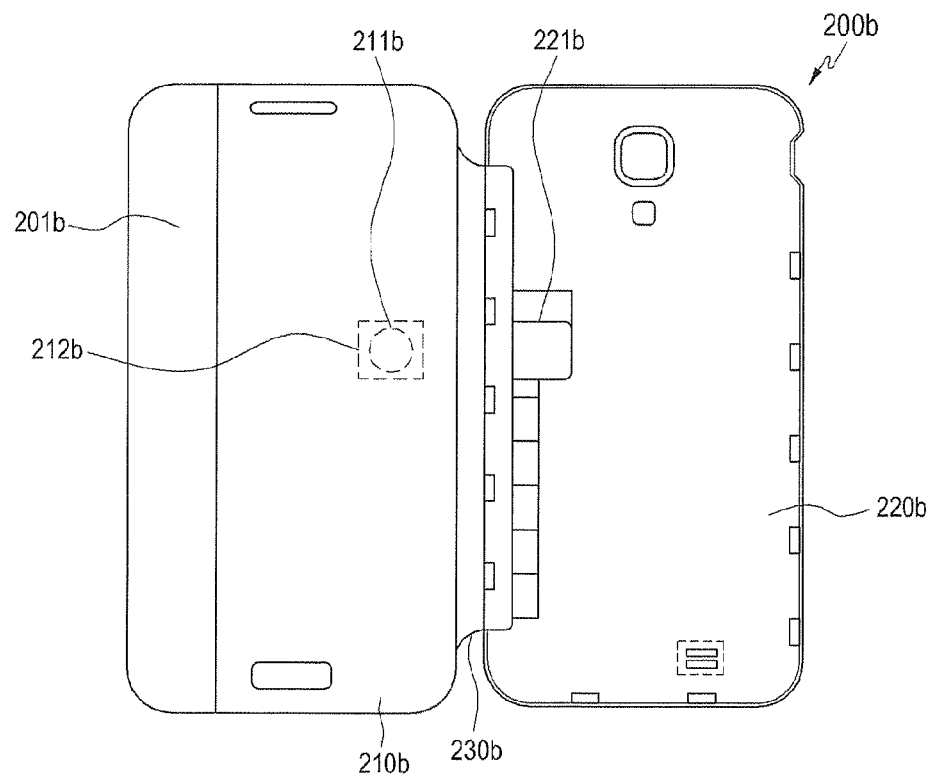

Further, as illustrated in FIG. 3D similarly to in FIG. 2D, a cover can include a rear cover 220b supporting a rear surface of the electronic device 100, a front cover 210b for protecting a front surface of the electronic device 100, and a connection part 230b integrally extending from the front cover 210b and connected to the rear cover 220b.

According to various embodiments, the front cover 210b can also move in a direction of covering the back of the rear cover 220b of the electronic device similarly to a direction of covering a display of the electronic device 100 due to flexibility of the connection part 230b connecting the front cover 210b and the rear cover 220b. Accordingly, though the front cover 210b does not close and moves in the direction of covering the back of the rear cover 220b, the electronic device 100 can recognize closing of the front cover 210b due to a magnetic force of a magnet 211b provided to the front cover 210b. Thus, when the front cover 210b moves in the direction of covering the back of the rear cover 220b, shielding units 212b and 221b for shielding the magnetic force of the magnet 211b can be required to prevent the electronic device from recognizing the magnetic force of the magnet 211b. The shielding unit 221b can be provided to the rear cover 220b such that the electronic device can detect the magnetic force of the magnet 211b only when the front cover 210b moves in the direction of covering the electronic device 100.

According to the various embodiments, the front cover 210b can also move in the direction of covering the display of the electronic device 100 due to the flexibility of the connection part 230b connecting the front cover 210b and the rear cover 220b. At this time, the opening/closing of the cover can also be determined by the aforementioned various types of sensors (e.g., the illumination sensor, etc.).

Figure 4:
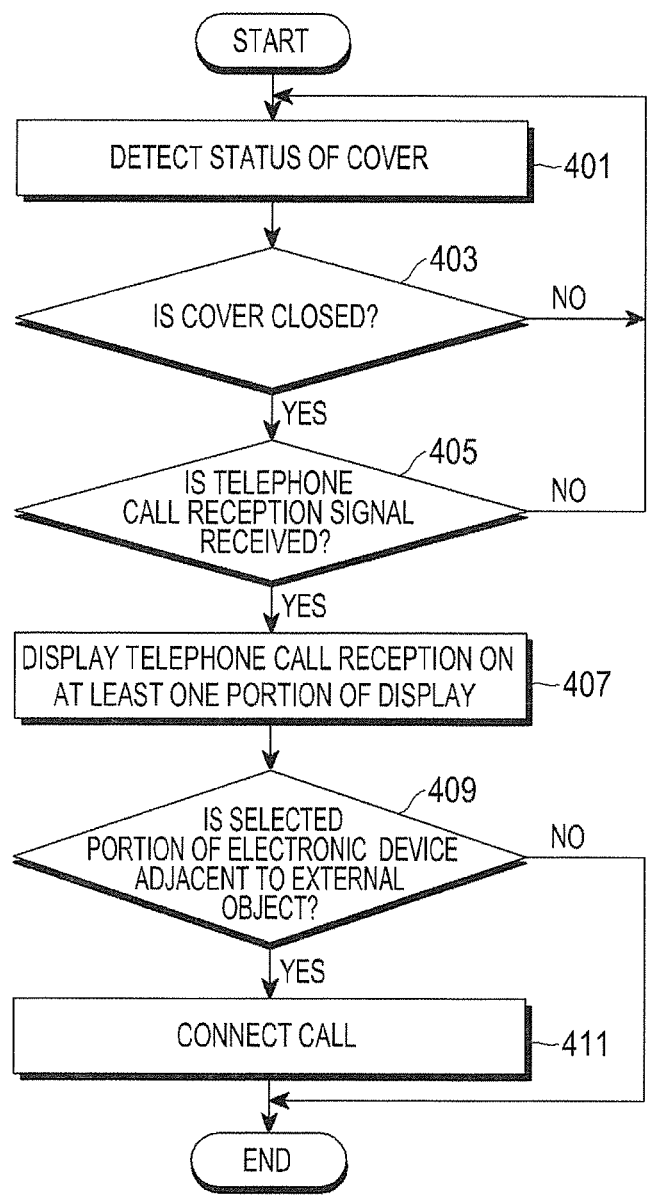
FIGS. 4 and 5 are flowcharts illustrating a procedure of performing functions of an electronic device according to an embodiment of the present disclosure.

FIG. 4 is a flowchart illustrating a procedure of performing functions of an electronic device according to an embodiment of the present disclosure. At least one of operations 401 to 411 can be omitted. Further, at least one of operations 401 to 411 can be changed in order.

In operation 401, the electronic device detects whether a cover formed to cover at least one portion of a display has covered the at least one portion of the display. When it is determined in operation 403 that the cover has covered the at least one portion of the display, if a call reception signal is received in operation 405, the electronic device can display the call reception on at least one portion of the display in response to the reception of the call reception signal, in operation 407.

After displaying the call reception, the electronic device can detect in operation 409 whether a selected portion of one surface of the electronic device including the display is adjacent to an external object while the cover is covering the display. In operation 411, the electronic device can perform an operation of connecting the call in response to the detection of the adjacency while the cover is covering the display.

Figure 5:
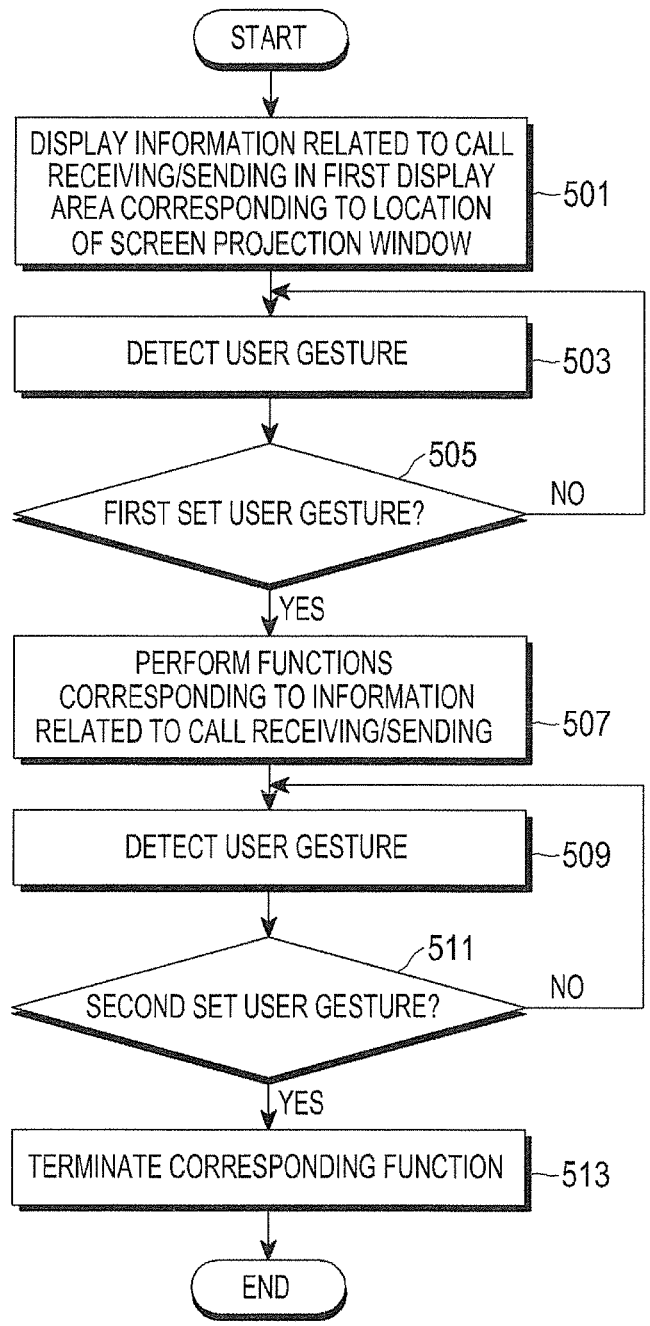

FIG. 5 is a flowchart illustrating a procedure of performing functions of an electronic device according to another embodiment of the present disclosure.

At least one of operations 501 to 513 can be omitted. Further, at least one of operations 501 to 513 can be changed in order. In the following description, a screen area on a touch screen corresponding to a location of a screen projection window of a cover when the cover covers the touch screen is referred to as a first display area for convenience of description.

In operation 501, the electronic device can display information related to termination/origination in the first display area. It is assumed in operation 501 that the cover is closed (e.g., the touch screen is covered with the cover). As described above, the first display area can be a display area corresponding to the location of the screen projection window. A screen displayed through the screen projection window while the cover is closed can be set in advance or can be changed by a user according to the embodiment of the present disclosure. The information related to the termination/orientation can include at least one of information for notifying of call termination, information of a counterpart terminal in the case of the call termination, and information of the counterpart terminal for call origination.

The electronic device detects a user gesture in operation 503, and then, proceeds to operation 505.

The electronic device determines in operation 505 whether the detected gesture corresponds to a first gesture of a user which has been set, and when the detected gesture corresponds to the first gesture of the user which has been set, the electronic device proceeds to operation 507. The first gesture of the user can be a user gesture associated with call termination/orientation.

In operation 507, the electronic device can perform functions corresponding to the information related to the termination/orientation. For example, when information being displayed in the first display area corresponds to information on call termination, the electronic device can process the termination for an incoming call. Further, for example, when information being displayed in the first display area corresponds to information for call origination, for example, contact information, the electronic device can perform the call origination with the currently displayed contact information. Further, according to another embodiment of the present disclosure, while a plurality of pieces of contact information are displayed in the first display area, the electronic device can perform call origination with contact information for which there has been call termination most recently.

In operation 507, the electronic device can further consider sensing information which has been set, in performing the functions corresponding to the information related to the termination/orientation. For example, the electronic device can perform the functions in a case in which a movement of the whole or a part of the electronic device is detected due to a user's motion and the set sensing information is lower than or equal to a set threshold value. For example, the sensing information can be an illumination value. As an example, when a user holds the electronic device to his/her ear for termination/orientation, an illumination value can be lowered (e.g., an illumination value can be lowered from a predetermined value to zero). In this case, the electronic device can perform the termination/orientation in view of the first gesture of the user and the set sensing information or a change in the sensing information.

Further, according to the various embodiments of the present disclosure, when a user holds the electronic device to his/her ear for termination/orientation, a part of the electronic device (e.g., the first display area) can recognize the ear as a hovering motion. For example, when the user lifts and holds the electronic device to his/her ear, the movement of the electronic device can be detected by various types of sensors (e.g., an acceleration sensor, a gyro sensor, and the like) of the electronic device, the user's ear can be recognized as a hovering motion in an area over a set range (e.g., in an area of more than 50 percent) of the first display area as the user's ear approaches the electronic device, and such a gesture of the user can also be made recognized as a gesture for termination/orientation.

In performing the functions corresponding to the information related to the termination/orientation in operation 507, the electronic device can perform the functions when the first gesture of the user is made in a state in which a set trigger (e.g., a user input) has been generated. The trigger can be generated by a set key input. For example, the key input can be performed through a physical button provided at one side of the electronic device. As an example, the key input can include a gesture touch, a swipe, or a hovering motion of a user, which is made through the screen projection window.

The electronic device detects a user gesture in operation 509 and then, proceeds to operation 511.

The electronic device determines in operation 511 whether the detected gesture corresponds to a second gesture of a user which has been set, and when the detected gesture corresponds to the second gesture of the user which has been set, the electronic device proceeds to operation 513. The second gesture of the user can be a user gesture associated with call termination/orientation. For example, the second gesture of the user can be a gesture based on a direction opposite to that of the first gesture of the user. A method of detecting the second gesture of the user can be performed identically or similarly to the method of detecting the first gesture of the user. For example, when the electronic device moves downwards from a stationary state and then, stops again, the electronic device can determine that the second gesture of the user has been made.

In operation 513, the electronic device can terminate the corresponding function according to the second gesture of the user. For example, the electronic device can terminate a call being currently established.

Hereinafter, various embodiments to which the embodiments of the present disclosure can be applied according to various situations will be described with reference to FIGS. 6 to 13.

Figure 6:
FIG. 6 illustrates a user gesture according to an embodiment of the present disclosure.

FIG. 6 illustrates an example of a user gesture according to an embodiment of the present disclosure. For example, a first gesture of a user can be a user gesture of lifting an electronic device for call origination or termination as illustrated in FIG. 6. The first gesture of the user can be detected using various types of sensors provided to the electronic device. For example, the first gesture of the user can be detected using at least one of a motion sensor, an acceleration sensor, and a gyro sensor.

For example, when a movement of the electronic device according to settings is detected, the electronic device can determine that the first gesture of the user has been made. For example, when the electronic device moves upwards from a stationary state and then, stops again, the electronic device can determine that the first gesture of the user has been made.

Figure 7:
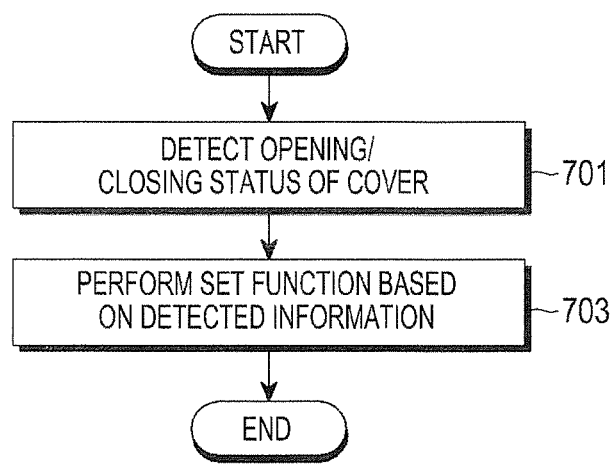
FIG. 7 is a flowchart illustrating a procedure of performing functions of an electronic device by detection of an opening and/or closing status of a cover according to an embodiment of the present disclosure.

FIG. 7 is a flowchart illustrating a method of performing a function according to another embodiment of the present disclosure. An electronic device detects an opening/closing status of a cover in operation 701 and then, proceeds to operation 703.

In operation 703, the electronic device can perform a set function based on the detected opening/closing status information of the cover.

In an embodiment, the cover can be a cover in which the screen projection window described above with reference to FIGS. 2A to 3D is formed. When the cover is detected to be closed, the electronic device can display a screen that is set to a first display area corresponding to a location of the screen projection window or set by a user.

In another embodiment, when the cover is detected to be open, the electronic device can display a screen that is set to a full screen or a partial area of the screen or set by a user.

In another embodiment, when the cover is detected to be open, the electronic device can display a screen that is set to the first display area corresponding to the location of the screen projection window or set by a user.

A method of operating an electronic device including a display according to any one of various embodiments of the present disclosure can include detecting, by the electronic device, whether a cover formed to cover at least one portion of the display covers the at least one portion of the display; receiving, by the electronic device, a telephone call reception signal while the cover is detected to cover the at least one portion of the display; displaying, by the electronic device, telephone call reception on the at least one portion of the display in response to the reception of the telephone call reception signal while the cover is detected to cover the at least one portion of the display; detecting, by the electronic device, whether at least one portion of one surface of the electronic device containing the display is adjacent to an external object while the cover covers the at least one portion of the display, after the displaying of the telephone call reception; and connecting, by the electronic device, a telephone call in response to the detection of the adjacency while the cover covers the at least one portion of the display.

Detecting of the adjacency of the external object can be performed by at least one sensor provided to the electronic device. Detecting of the adjacency of the external object can be performed by a user gesture for moving the electronic device.

The method can further include acquiring set sensing information, and a set function can be performed when a first gesture of a user is detected and the acquired sensing information is lower than or equal to a set threshold value. The sensing information can include an illumination value.

The method can further include determining whether a first gesture of a user is made, after receiving a user input, and performing a set function when the first gesture of the user is made after the receiving of the user input. The user input is generated by a set key input.

The method can further include terminating the set function when a second set gesture of the user is detected, after the performing of the set function. The second gesture of the user can be a user gesture having a different direction from that of the first gesture.

A method of operating an electronic device including a display according to any one of various embodiments of the present disclosure can include detecting, by the electronic device, whether a cover formed to cover at least one portion of the display has covered the at least one portion of the display; displaying, by the electronic device, a screen configured according to a screen mode set to at least one portion of the display, while the cover is detected to cover the at least one portion of the display; detecting, by the electronic device, a gesture of a user while it is detected that the at least one portion of the display is covered with the cover; and changing, by the electronic device, the displayed screen to another screen related to at least one application and displaying the changed another screen in response to the detecting of the gesture while the cover covers the at least one portion of the display.

The gesture can be characterized by a flicking gesture.

Another screen related to the application can be at least one selected from a recently used application list, an address list, a music playback list, and a recent incoming/outgoing list.

A method of performing a function of an electronic device according to any one of various embodiments of the present disclosure can include detecting an opening/closing status of a cover that covers a display area of the electronic device and is formed in at least one area thereof with a screen projection window; and performing a set function based on the detected information.

The performing of the set function can include displaying a screen set to a first display area corresponding to a location of the screen projection window when the cover is detected to be closed.

The set screen can be a screen obtained by resizing a screen displayed in a second set display area of the electronic device while the cover is open The second display area can be a full display area of the electronic device.

The performance of the set function can include generating a photography image when the cover is detected to be open.

The method can further include storing the generated photography image or transmitting the generated photography image to an outside.

The performance of the set function can include executing at least one application when the cover is detected to be open.

The at least one application can be at least one of a most recently used application and an application set by a user.

The performance of the set function can include performing a function for establishing a call when it is detected that the cover is open and then, is closed within a set period of time.

The performance of the set function can include entering a mode for hovering detection when the cover is detected to be closed.

Figure 8:
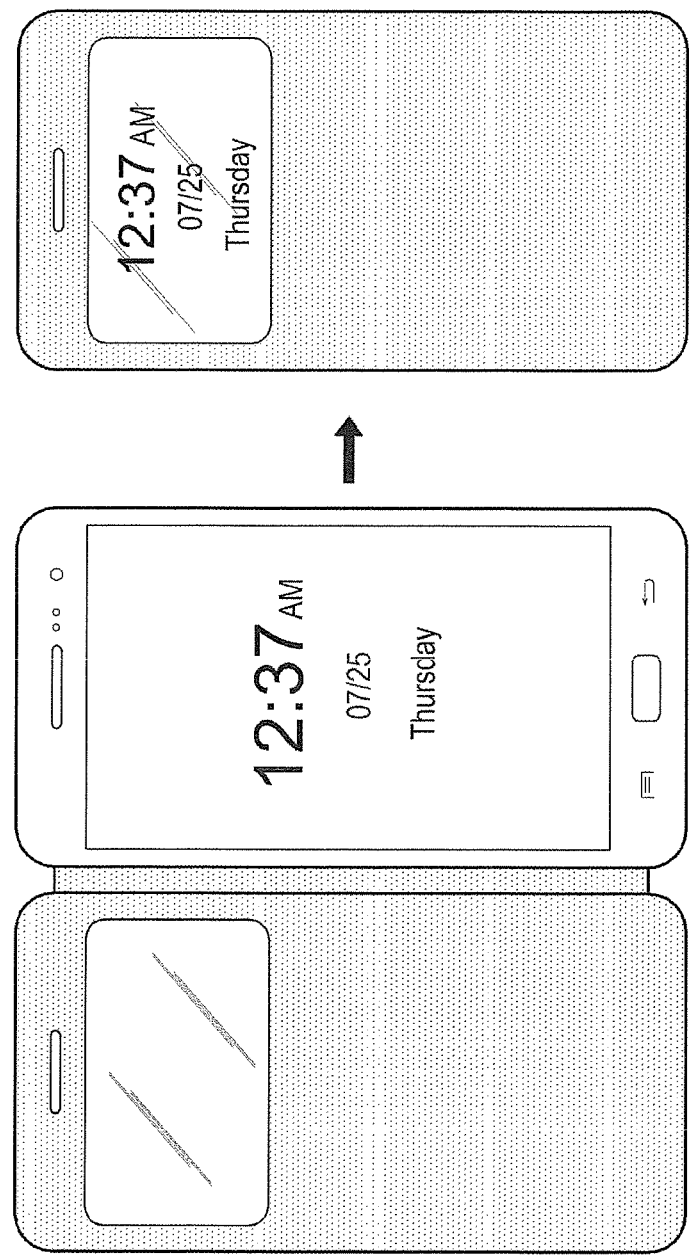
FIG. 8 illustrates a resized screen according to an embodiment of the present disclosure.

FIG. 8 illustrates an example of a resized screen according to an embodiment of the present disclosure. For example, as illustrated in FIG. 8, a screen displayed in a first set display area of an electronic device in a state in which a cover is closed can be a resized screen of a screen displayed in a second set display area of the electronic device in a state in which the cover is open. The second display area can be an entire display area of the electronic device.

In an embodiment, a text, a picture, a symbol, and the like on the screen displayed in the first display area can be resized at the same ratio or at different ratios. Further, a location and an arrangement method of the text, the picture, the symbol, and the like can be changed to be suitable for the first display area.

In an embodiment, any one of elements, such as an icon and various pieces of information representing a status of the electronic device, displayed on the original screen (e.g., the screen displayed in the second display area) can be omitted on the screen displayed in the first display area. The icon can be an application icon and a widget type of icon. The status of the electronic device can include an operation status of a currently running application and a widget.

In one embodiment, at least one set task list or at least one recent task list registered in a task manager through recent usage of a user can be executed through a left and right panning operation or an up and down scroll operation on the screen displayed in the first display area. The task list is not limited to a list in a text form, and can be a list in an application screen or widget form. Further, the task list can be represented as an image in an icon form and a widget form. In an embodiment, various lists (e.g., the latest termination/orientation list, a message list, a music reproduction list, and the like) or icons in addition to the designated or recent task list can be displayed on the screen displayed in the first display area. The list displayed in the first display area can be automatically scrolled through face detection or pupil detection of a motion sensor or a camera. For example, when a face is lowered, a pupil is lowered, or the electronic device is leaned downward, a scroll down function can be executed.

Further, in one embodiment, the indicator of FIG. 1B for operating an application of the electronic device 100 and performing detailed functions of the application can be displayed in an entire or partial area of the screen displayed in the first display area. Furthermore, in one embodiment, the status bar 192 of FIG. 1B for displaying the status of the electronic device 100 can be displayed in a different form in a partial area of the screen displayed in the first display area.

For example, the same indicator as that displayed in the second display area or an indicator obtained by re-editing or resizing the indicator displayed in the second display area can be displayed in the first display area. When a specific indicator displayed in the first display area is dragged in a predetermined direction (e.g., a downward direction) or selected through a touch, an instruction of the corresponding indicator can be executed or detailed contents can be resized and displayed. Further, for example, an icon for representing whether music is reproduced or an icon for reproduction/stop/pause of music can be displayed in an area of the indicator. For example, various icons for weather, a schedule (a calendar), a memo, and the like can also be displayed in the area for displaying the indicator.

In one embodiment, when the cover is detected to be open, the electronic device can generate a photography image. The photography image can be generated through a camera module located on a front surface of the electronic device. The electronic device can store the generated photography image in a memory, or can transmit the generated photography image to the outside. For example, the electronic device can transmit the generated photography image to a set contact point by using a message or e-mail.

In one embodiment, when the cover is detected to be open, the electronic device can photograph an image by driving a camera module, and can perform authentication of a user by analyzing the photographed image. For example, when it is determined, though a comparison of the photographed image to an image stored in a storage unit, that the user is an authorized user, the electronic device can be unlocked. Accordingly, the user can unlock the electronic device though a simple operation of opening the cover. Further, when an unauthorized user opens the cover, the user is not normally authenticated and thus, the electronic device can be maintained in the locking state.

In one embodiment, when the cover is detected to be open, the electronic device can execute at least one application. For example, when the cover is detected to be open, the electronic device can execute a most recently used or designated application. Further, for example, when the cover is detected to be open, the electronic device can execute at least one of set applications. Furthermore, when the cover is detected to be open, the electronic device can stop at least one of currently running applications.

In one embodiment, when opening and closing of the cover are detected, the electronic device can perform a function for establishing a call. For example, when the cover is detected to be open and then, closed within a set period of time, the electronic device can execute a function for establishing a call. For example, when there is call termination and opening and closing of the cover are detected, the electronic device can establish a call. Further, when there is an application being reproduced and opening and closing of the cover are detected, the electronic device can stop at least one of currently running applications.

FIGS. 9A to 9C illustrate examples of performing functions of an electronic device according to an embodiment of the present disclosure. For example, in a case where a cover includes the aforementioned screen projection window, information for notifying of call termination can be displayed in a first display area as illustrated in FIG. 9A. Further, in a case where the cover is open and then, is closed within a set period of time as illustrated in FIGS. 9B and 9C while the information for notifying of the call termination is displayed, the electronic device can establish an incoming call. On the other hand, in a case where the cover is open and then, is closed within a set period of time as illustrated in FIGS. 9B and 9C while the electronic device is making a call, the electronic device can terminate the incoming call.

In one embodiment, when the cover is detected to be closed, the electronic device can enter a mode for hovering detection. According to the embodiment, when the cover is detected to be closed, the electronic device can display the screen set to the first display area as illustrated above. In a case where the electronic device enters the mode for the hovering detection and a set user gesture is detected while the set screen is displayed, the electronic device can perform a function corresponding to the corresponding gesture. The function corresponding to the gesture can be, for example, a panning function, a scrolling function, or a touch operation defined by a user. The electronic device can display icons or widgets associated with a video player related function, a music player related function, a telephone related function, and a message transmission/reception related function, through the panning function, the scrolling function, or the touch operation.

In one embodiment, when the cover is detected to be closed, the electronic device can automatically operate in a hovering or glove mode. In a case where there is no user input for a preset period of time while the electronic device is operating in the hovering or glove mode as described above, the electronic device can also be implemented to automatically change to a sleep mode. Further, when a specific key (e.g., a hold key) is input in the sleep mode, the electronic device can operate again in the hovering or glove mode. The glove mode means a function for enabling a user to manipulate the screen set to the first display area or a surface area of the cover, even with wearing a glove (e.g., various materials of gloves such as a cotton glove, a leather glove, a rubber glove and the like) but not with bare hands. Thus, the user can make or receive a call by using a motion such as panning even with wearing the glove after closing the cover.

FIG. 10 illustrates an example of information displayed in a display area. For example, an electronic device can display information for notifying that there is call termination, as illustrated in FIG. 10A. When there is the call termination, the electronic device can display information of a counterpart terminal, for example, a user name and a phone number corresponding to the counterpart terminal through a screen projection window of a cover as illustrated in FIG. 10B.

Figure 10D:
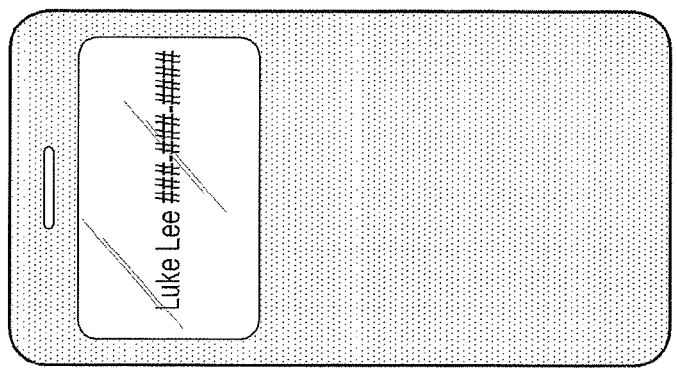
FIGS. 10A to 10D illustrate information displayed in a display according to an embodiment of the present disclosure.
Figure 10C:
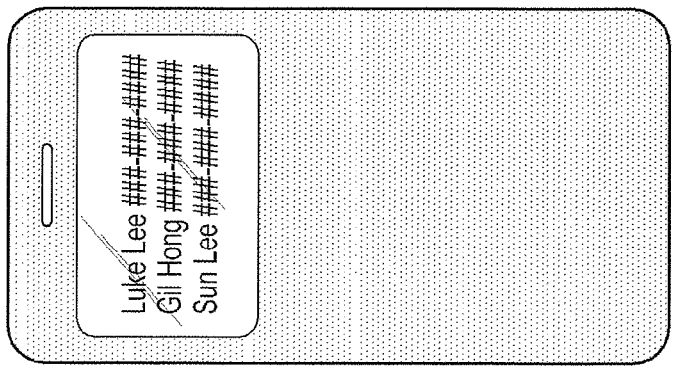
Figure 10B:
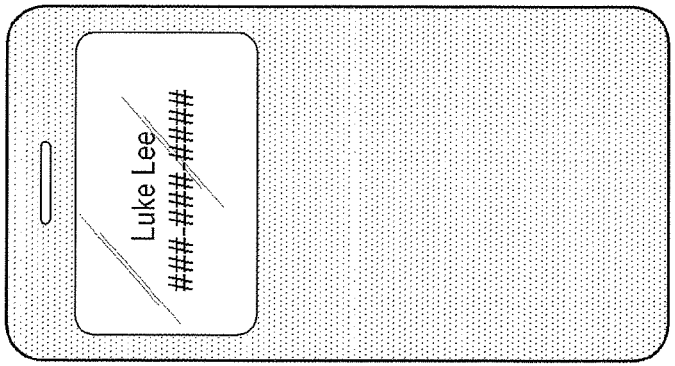
Figure 10A:
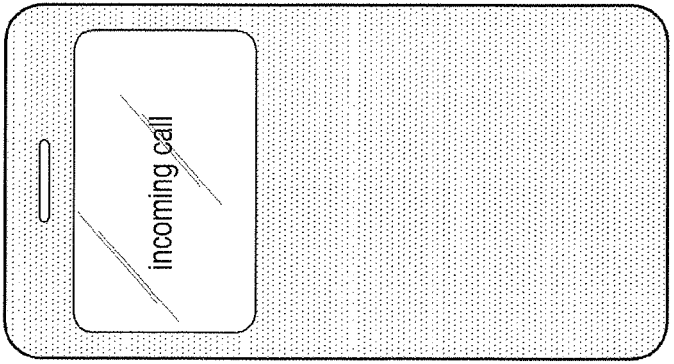

Next, the electronic device can display information of the counterpart terminal for call origination as illustrated in FIGS. 10C and 10D. Further, the electronic device can display a plurality of pieces of counterpart terminal information contained in an address book or can display a recent termination/origination list according to a user's input as illustrated in FIG. 10(c). Furthermore, the electronic device can display any one piece of counterpart terminal information selected by the user among the plurality of pieces of counterpart terminal information as illustrated in FIG. 10D.

Figure 11:
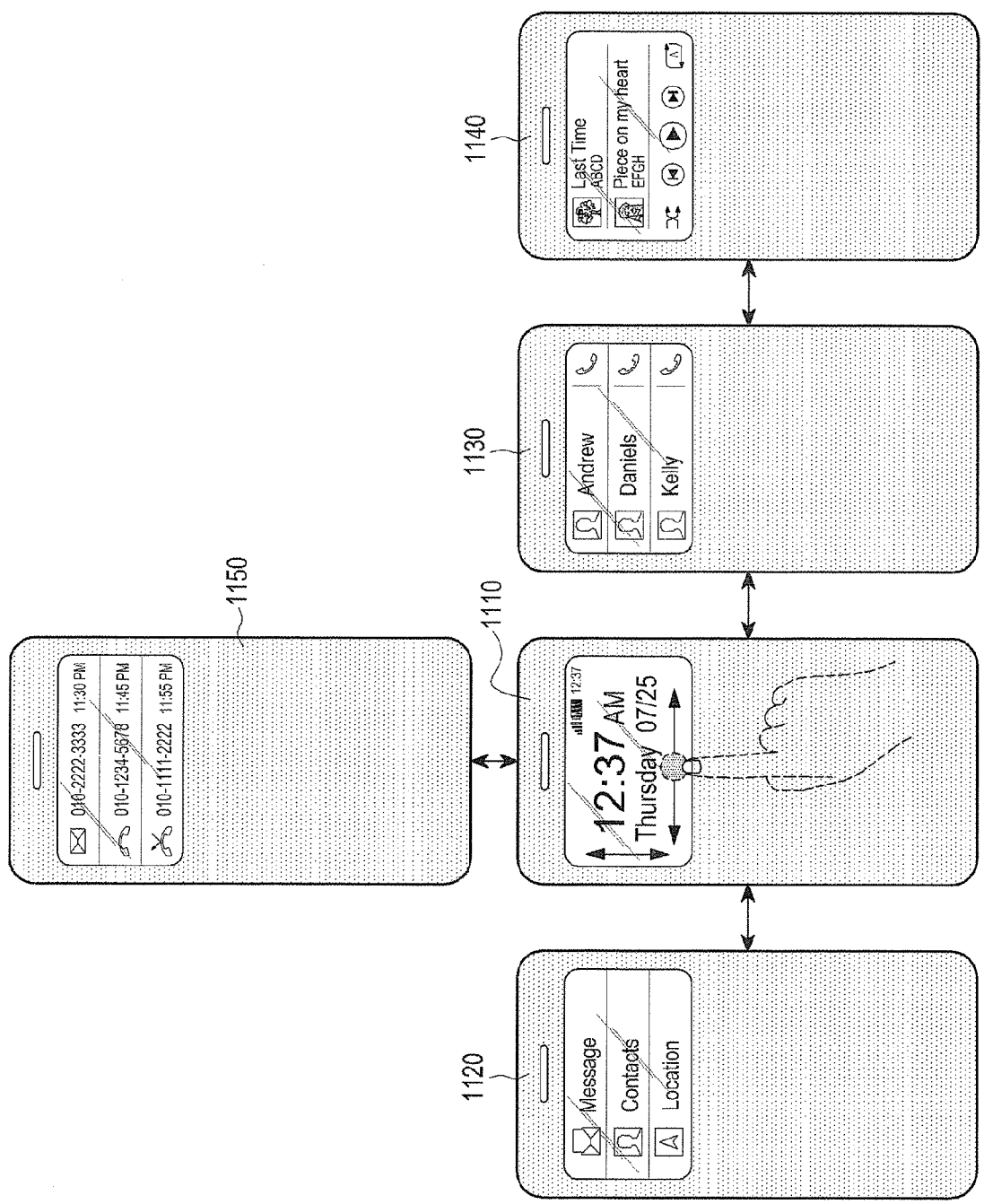
FIG. 11 illustrates a screen change according to a user's gesture in a display area according to an embodiment of the present disclosure.

FIG. 11 illustrates a screen change according to a user's gesture in a display area according to an embodiment of the present disclosure. Referring to FIG. 11, a resized standby screen is displayed through a screen projection window in a state in which a cover is closed. For example, various pieces of information such as time, a day of the week, a date, a battery status, an antenna reception status, and the like can be displayed according to a set method. When a user makes a specific gesture (e.g., a touch and drag, a swipe, a flick, and the like) on the standby screen, the standby screen can be changed to screens of various applications, panning leftward and rightward or upward and downward. For example, the standby screen can be changed to a screen of a recently used application list 1120, an address list 1130, a music playback list 1140, or a recent incoming/outgoing call list 1150. Although it is represented in FIG. 11 that the standby screen can be changed to the screens displaying various types of lists, the standby screen can also be changed to an execution screen of a preset specific application according to various embodiments of the present disclosure.

Figure 12A:
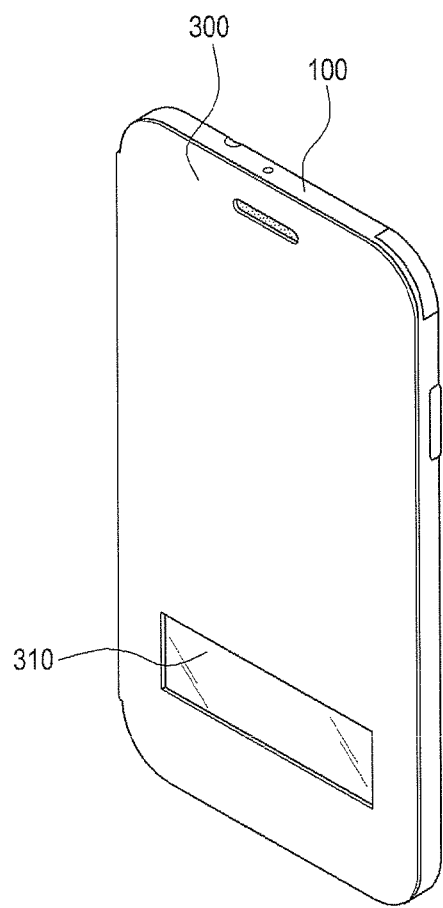
FIGS. 12A and 12B illustrate opening and closing statuses of a cover in an electronic device to which the cover according to an embodiment of the present disclosure is mounted.
Figure 12B:
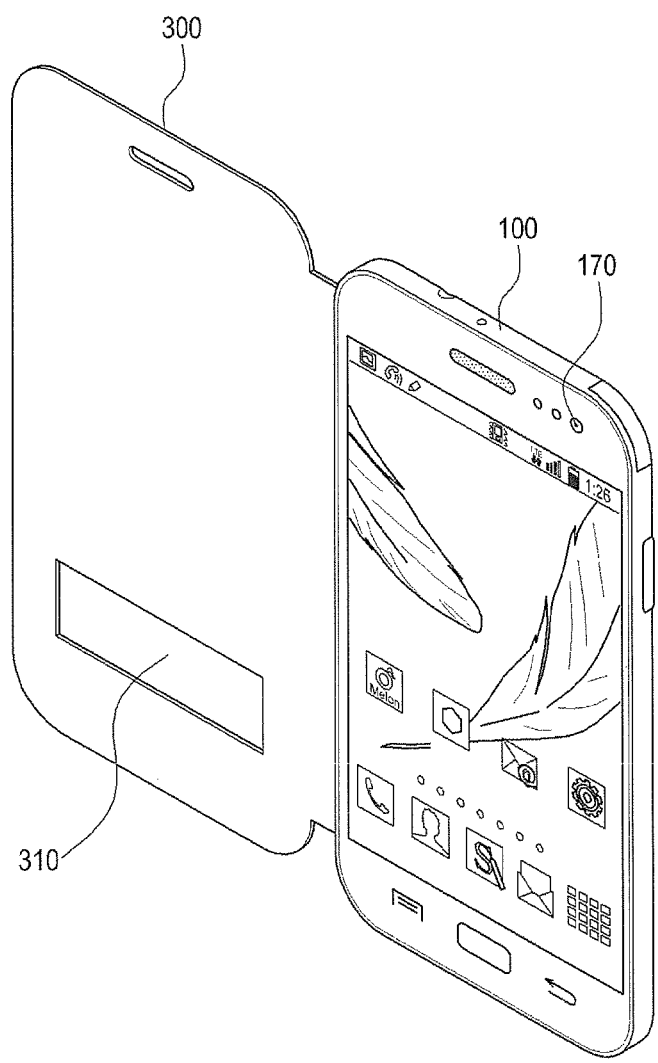

FIGS. 12A and 12B illustrate opening and closing statuses of a cover in an electronic device to which the cover according to an embodiment of the present disclosure is mounted.

Referring to FIGS. 12A and 12B, a screen projection window 310 can be formed on a lower side of a cover 300 attached to an electronic device 100.

Figure 13:
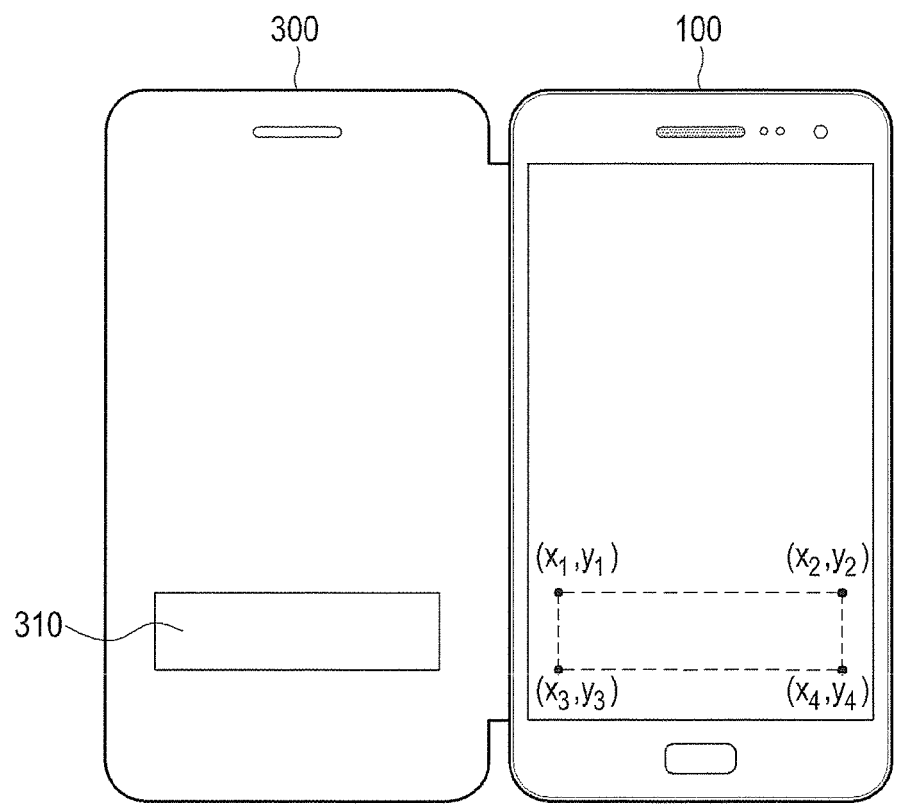
FIG. 13 illustrates a display area of an electronic device corresponding to a screen projection window of a cover according to an embodiment of the present disclosure.

FIG. 13 illustrates a display area of an electronic device corresponding to a screen projection window of a cover according to an embodiment of the present disclosure. Referring to FIG. 13, when a display area of an electronic device 100 is covered with a cover 300, an area corresponding to a screen projection window 310 can be stored as coordinate values. Accordingly, when it is determined that the cover 300 is closed, a resized screen can be displayed for the area corresponding to the stored coordinates in the display area.

Although the present disclosure has been described above in connection with specific items, such as detailed elements, limited embodiments, and the drawings, they are provided to help the general understanding of the present disclosure and the present disclosure is not limited to the above embodiments. Various modifications and changes can be made from the above description by those skilled in the art to which the present disclosure pertains.

Although the present disclosure has been described with an exemplary embodiment, various changes and modifications can be suggested to one skilled in the art. It is intended that the present disclosure encompass such changes and modifications as fall within the scope of the appended claims.

What is claimed is:

1. A method of operating an electronic device comprising a display, the method comprising:
    detecting whether a flip cover having a window covers at least one portion of the display;
    detecting an occurrence of an event while the flip cover is detected to cover the at least one portion of the display;
    displaying information related to the detection of the event occurrence on a region of the display, the region corresponding to the window;
    in response to detecting an opening and a closing of the flip cover within a threshold time, performing, at the electronic device, a function in association with the event.

2. The method of claim 1, wherein detecting an adjacent external object is performed by at least one sensor provided to the electronic device.

3. The method of claim 1, wherein detecting an adjacent external object is performed by a user gesture of moving the electronic device.

4. The method of claim 1, further comprising:
    acquiring sensing information on a first gesture of a user is detected.

5. The method of claim 4, wherein the sensing information comprises an illumination value.

6. The method of claim 1, further comprising:
    detecting whether a first gesture of a user is made after receiving a user input, and performing a function corresponding to the first gesture of the user.

7. The method of claim 6, wherein the user input is generated by a key input.

8. The method of claim 6, further comprising:
    terminating the function when a second set gesture of the user is detected.

9. The method of claim 8, wherein the second gesture of the user is a user gesture having a different direction from that of the first gesture.

10. A method of operating an electronic device comprising a display, the method comprising:
    detecting whether a flip cover has covered at least one portion of the display;
    displaying a user interface according to a preset screen mode on the at least one portion of the display while the flip cover is detected to cover the at least one portion of the display;
    detecting an occurrence of an event while the flip cover covers the at least one portion of the display;
    detecting a gesture of a user, the gesture comprising an opening and a closing the flip cover within a threshold time while the at least one portion of the display is covered with the flip cover; and
    displaying a second user interface in association with the event in response to the detection of the gesture.

11. The method of claim 10, wherein the gesture comprises a flicking gesture.

12. The method of claim 10, wherein the second user interface comprises at least one of a recently used application list, an address list, a music playback list, or a recent incoming/outgoing list.

13. A method of operating an electronic device, the method comprising:
    detecting an opening or closing of a flip cover, the flip cover configured to cover at least one portion of the display and has a window;
    detecting, at the electronic device, an event occurring while the flip cover is detected to cover the at least one portion of the display;
    displaying an information related to the detection of the event occurrence on a region of the display, the region corresponding to the window;
    in response to detecting an opening and a closing of the flip cover within a threshold time, performing, at the electronic device, a function
    performing, at the electronic device, a preset function corresponding to the event.

14. The method of claim 13, wherein performing the function comprises:
    displaying a first user interface through the window on the display when the flip cover is detected to be closed.

15. The method of claim 14, wherein the first user interface is resized to be a second user interface when the flip cover is open.

16. The method of claim 15, wherein the second user interface is of a full size of the display.

17. The method of claim 13, wherein performing the function comprises:
    generating a photography image taken at the time when the flip cover is detected to be open.

18. The method of claim 17, further comprising:
    storing the generated photography image or transmitting the generated photography image to an outside device.

19. The method of claim 13, wherein the performing the set function comprises:
    executing at least one application when the flip cover is detected to be open.

20. The method of claim 19, wherein the at least one application comprises at least one of a most recently used application and an application set by a user.

21. The method of claim 13, wherein performing the set function comprises:
    establishing a call when it is detected that the flip cover is open and then, is closed within a set period of time.

22. The method of claim 13, wherein the performing the set function comprises:
    entering a mode for hovering detection when the flip cover is detected to be closed.

23. An electronic device comprising:
    a display configure to display an image or video;
    a first sensor configured to detect an opening and closing of a flip cover with a window, the flip cover covering at least portion of the display;
    a second sensor configured to detect a user's gesture; and
    a controller configured to:
        detect an event occurring while the flip cover covers the display;
        cause the display to indicate a detection of the event occurrence on the display, and
        in response to detecting an opening and a closing of the flip cover within a threshold time, performing a function in association with the event.

24. The electronic device of claim 23, wherein the first sensor is configured to acquire set sensing information, the second sensor is configured to detect a first gesture of a user, and the controller is configured to perform a function corresponding to the first gesture when the sensing information is lower than or equal to a threshold value.

25. The electronic device of claim 24, wherein the sensing information comprises an illumination value.

26. The electronic device of claim 23, wherein the controller is configured to determine whether a first gesture of a user is made and perform the function when the first gesture of the user is made.

27. The electronic device of claim 26, wherein the user input is generated by a key input.

28. The electronic device of claim 26, wherein the controller is configured to control the function to be terminated when a second set gesture of the user is detected after the function is performed.

29. The electronic device of claim 28, wherein the second gesture of the user is a user gesture having a different direction from that of the first gesture.

* * * * *